United States Patent
Takeda

(10) Patent No.: US 9,205,867 B2
(45) Date of Patent: Dec. 8, 2015

(54) STABILITY CONTROL DEVICE

(71) Applicant: NISSAN MOTOR CO., LTD., Yokohama-shi, Kanagawa (JP)

(72) Inventor: Yuya Takeda, Yokohama (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/425,146

(22) PCT Filed: Aug. 28, 2013

(86) PCT No.: PCT/JP2013/073019
§ 371 (c)(1),
(2) Date: Mar. 2, 2015

(87) PCT Pub. No.: WO2014/038452
PCT Pub. Date: Mar. 13, 2014

(65) Prior Publication Data
US 2015/0246687 A1 Sep. 3, 2015

(30) Foreign Application Priority Data

Sep. 4, 2012 (JP) ................................ 2012-193663
Jan. 10, 2013 (JP) ................................ 2013-002207

(51) Int. Cl.
*A01B 69/00* (2006.01)
*B62D 6/04* (2006.01)
*B62D 6/00* (2006.01)
*B62D 15/02* (2006.01)
*G06K 9/00* (2006.01)

(52) U.S. Cl.
CPC *B62D 6/04* (2013.01); *B62D 6/002* (2013.01); *B62D 6/003* (2013.01); *B62D 6/008* (2013.01); *B62D 15/025* (2013.01); *G06K 9/00798* (2013.01)

(58) Field of Classification Search
CPC .............................. B62D 6/002; G06K 9/00798
USPC ........................................................ 701/41
See application file for complete search history.

(56) References Cited

U.S. PATENT DOCUMENTS

| | | | | | |
|---|---|---|---|---|---|
| 5,828,972 | A | * | 10/1998 | Asanuma | B62D 5/006 180/446 |
| 2001/0011201 | A1 | * | 8/2001 | Nishizaki | B62D 5/006 701/41 |
| 2003/0060955 | A1 | * | 3/2003 | Suissa | B62D 6/003 701/41 |
| 2004/0016294 | A1 | * | 1/2004 | Sugitani | B60T 8/172 73/146 |
| 2004/0200661 | A1 | * | 10/2004 | Sugitani | B60D 6/008 180/402 |
| 2004/0200662 | A1 | * | 10/2004 | Tajima | B62D 6/008 180/402 |

(Continued)

FOREIGN PATENT DOCUMENTS

| | | |
|---|---|---|
| DE | 102006025380 A1 | 12/2006 |
| JP | 2000025630 A | 1/2000 |

(Continued)

*Primary Examiner* — Redhwan K Mawari
(74) *Attorney, Agent, or Firm* — Young Basile

(57) ABSTRACT

The turning angle of the left and right front wheels is controlled based on an SBW command turning angle corresponding to the steering angle of a steering wheel mechanically uncoupled from the left and right front wheels and a disturbance suppression command turning angle to suppress the yaw angle generated in the vehicle by disturbance. The steering reaction force to be applied to a column shaft is controlled based on the steering angle of the steering wheel.

7 Claims, 11 Drawing Sheets

(56) References Cited

U.S. PATENT DOCUMENTS

| | | | |
|---|---|---|---|
| 2006/0200289 A1* | 9/2006 | Chino | B62D 5/003 701/41 |
| 2006/0289226 A1 | 12/2006 | Sugitani | |
| 2008/0230300 A1* | 9/2008 | Hara | B62D 6/008 180/402 |
| 2009/0248250 A1* | 10/2009 | Yasui | B62D 6/003 701/42 |
| 2009/0312909 A1* | 12/2009 | Onuma | B62D 6/008 701/41 |
| 2010/0250068 A1 | 9/2010 | Yamazaki | |
| 2014/0303850 A1* | 10/2014 | Chai | B62D 6/008 701/42 |
| 2015/0246687 A1* | 9/2015 | Takeda | B62D 6/002 701/41 |

FOREIGN PATENT DOCUMENTS

| | | |
|---|---|---|
| JP | 2001-301638 A | 10/2001 |
| JP | 2006321471 A | 11/2006 |
| JP | 2007015545 A | 1/2007 |
| JP | 2008094111 A | 4/2008 |
| JP | 2010-188884 A | 9/2010 |

* cited by examiner

STABILITY CONTROL DEVICE

CROSS REFERENCE TO RELATED APPLICATIONS

The present application claims priority to Japanese Patent Application Nos. 2012-193663, filed Sep. 4, 2012 and 2013-002207, filed on Jan. 10, 2013, each incorporated herein in its entirety.

TECHNICAL FIELD

The present invention relates to a stability control device.

BACKGROUND

For a steer-by-wire steering device in which a steering wheel and a turning wheel are mechanically uncoupled, Japanese Patent Application Publication No. 2000-25630 discloses a technology of applying a steering reaction force component corresponding to disturbance such as crosswind to the steering wheel so that a turning angle of the turning wheel to suppress the influence of the disturbance on vehicle behavior can be obtained.

However, the above conventional technology has a problem of causing a driver to feel a sense of discomfort, since the steering reaction force component that encourages turning to suppress the disturbance is applied to the steering wheel.

SUMMARY

It is an object of the present invention to provide a stability control device capable of reducing the sense of discomfort experienced by the driver.

In the present invention, a turning amount of a turning unit is controlled based on a steer-by-wire turning amount corresponding to a steering amount of a steering unit which is mechanically uncoupled from the turning unit and a suppression turning amount to suppress a yaw moment generated in a vehicle by disturbance, and a steering reaction force to be applied to the steering unit is controlled based on the steering amount.

Therefore, it is no longer necessary to apply the steering reaction force component that encourages turning to suppress the disturbance. Moreover, since the steering reaction force is not changed by the turning to suppress the disturbance, the sense of discomfort experienced by the driver can be reduced.

DESCRIPTION OF EMBODIMENTS

Figure 1:
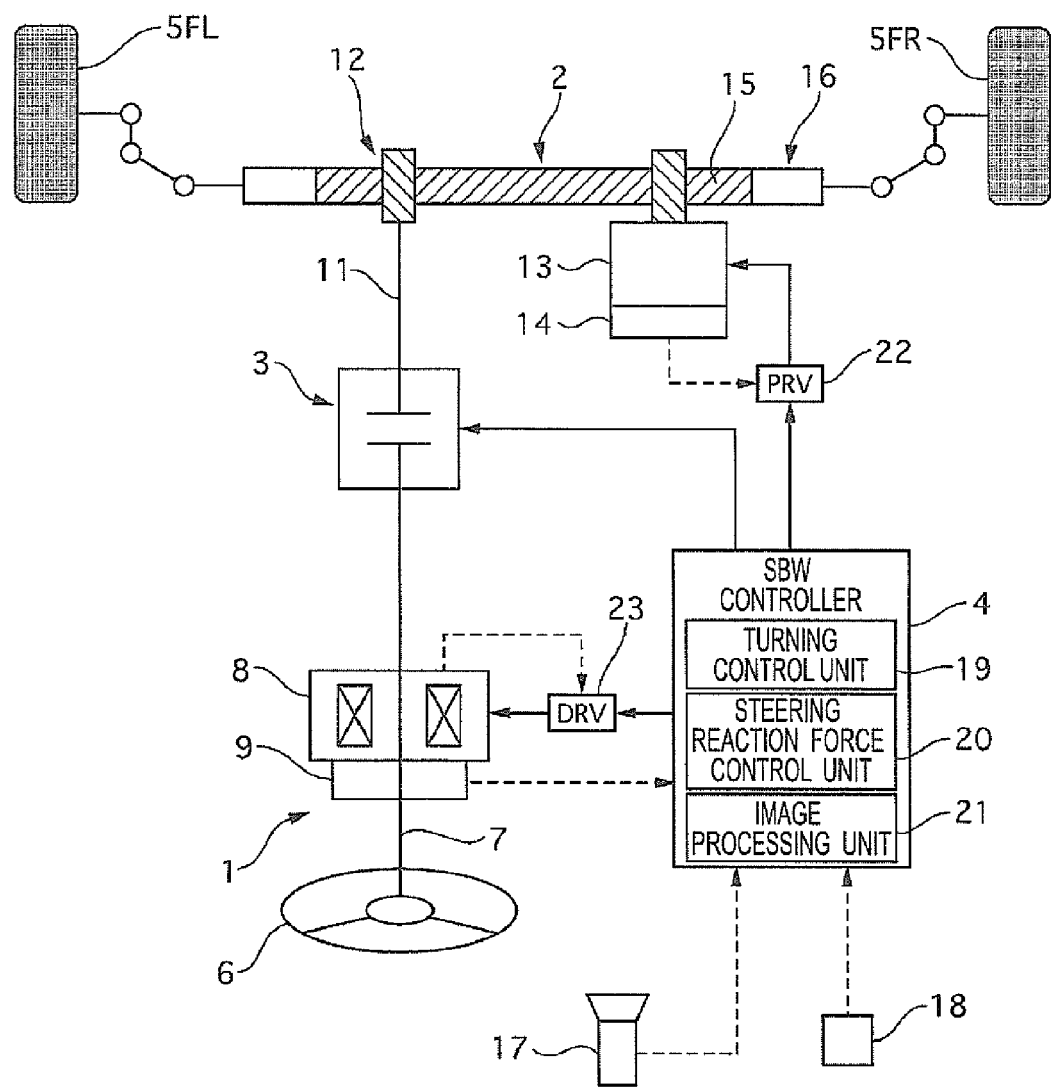
FIG. 1 is a system diagram showing a steering system of a vehicle according to Example 1.

FIG. 1 is a system diagram showing a steering system of a vehicle according to Example 1.

A steering device according to Example 1 mainly includes a steering unit 1, a turning unit 2, a backup clutch 3 and an SBW controller 4. The steering device adopts a steer-by-wire (SBW) system in which the steering unit 1 configured to receive a steering input from a driver is mechanically uncoupled from the turning unit 2 configured to turn left and right front wheels (turning wheels) 5FL and 5FR.

The steering unit 1 includes a steering wheel 6, a column shaft 7, a reaction force motor 8 and a steering angle sensor 9. The column shaft 7 rotates integrally with the steering wheel 6. The reaction force motor 8 is a brushless motor, for example, and is a coaxial motor whose output shaft is coaxial with the column shaft 7. The reaction force motor 8 outputs a steering reaction force torque to the column shaft 7 in response to a command from the SBW controller 4. The steering angle sensor 9 detects an absolute rotation angle of the column shaft 7, i.e., a steering angle of the steering wheel 6.

The turning unit 2 includes a pinion shaft 11, a steering gear 12, a turning motor 13 and a turning angle sensor 14. The steering gear 12 is a rack and pinion type steering gear, and turns the front wheels 5L and 5R according to rotation of the pinion shaft 11. The turning motor 13 is a brushless motor, for example, and has an output shaft coupled to a rack gear 15 through an unillustrated reducer. The turning motor 13 outputs a turning torque to turn the front wheels 5 to a rack 16 in response to a command from the SBW controller 4.

The turning angle sensor 14 detects an absolute rotation angle of the turning motor 13. Here, the rotation angle of the turning motor 13 and the turning angle of the front wheels 5 always have a uniquely defined correlation with each other. Thus, the turning angle of the front wheels 5 can be detected from the rotation angle of the turning motor 13. Hereinafter, unless otherwise described, it is assumed that the turning angle of the front wheels 5 is calculated from the rotation angle of the turning motor 13.

The backup clutch 3 is provided between the column shaft 7 in the steering unit 1 and the pinion shaft 11 in the turning unit 2. The backup clutch 3 mechanically uncouples the steering unit 1 from the turning unit 2 when released, and mechanically couple the steering unit 1 to the turning unit 2 when engaged.

In addition to the steering angle sensor 9 and the turning angle sensor 14, an image of a driving road in front of an own vehicle, which is shot by a camera 17, and a vehicle speed (vehicle body speed) detected by a vehicle speed sensor 18 are inputted to the SBW controller 4. The SBW controller 4 includes: a turning control unit 19 configured to control the turning angle of the front wheels 5FL and 5FR; a steering reaction force control unit 20 configured to control the steering reaction force torque to be applied to the column shaft 7; and an image processing unit 21.

The turning control unit 19 generates a command turning angle based on certain kinds of input information, and outputs the generated command turning angle to a current driver 22. The current driver 22 controls a command current to the turning motor 13 by angle feedback to cause an actual turning angle detected by the turning angle sensor 14 to coincide with the command turning angle.

The steering reaction force control unit 20 generates a command steering reaction force torque based on certain kinds of input information, and outputs the generated command steering reaction force torque to a current driver 23.

The current driver 23 controls a command current to the reaction force motor 8 by torque feedback to cause an actual steering reaction force torque estimated from a current value of the reaction force motor 8 to coincide with the command steering reaction force torque.

The image processing unit 21 recognizes white lines (driving lane marking) on the left and right of a driving lane by performing image processing, such as edge extraction, on the image of the driving road in front of the own vehicle shot by the camera 17. Then, the image processing unit 21 outputs white line information (locations, directions and the like) of the left and right white lines to the turning control unit 19 and the steering reaction force control unit 20. When the image processing unit 21 recognizes only one of the white lines on the left and right of the driving lane and does not recognize the other white line (when the one-side white line is lost), the image processing unit 21 determines the degree of recognition stability for the recognized white line, and outputs the determination result included in the white line information of the one white line that is not lost. The recognition stability is an index indicating continuous and stable recognition of the white lines. In Example 1, the recognition stability is determined from the number of detected edge points and the degree of dispersion of edge point groups in a vehicle width direction. For example, when a predetermined number of edge points or more are detected within a predetermined period of time and the degree of dispersion of edge point groups is a predetermined value or less, the recognition stability is determined to be high, and otherwise, is determined to be low.

In addition, in case of a failure of the SBW system, the SBW controller 4 mechanically couples the steering unit 1 to the turning unit 2 by engaging the backup clutch 3, thereby enabling the rack 16 to be moved in an axial direction by steering of the steering wheel 6. In this event, control may be performed, which is equivalent to an electric power steering system to assist steering force of a driver with an assist torque of the turning motor 13.

The above SBW system may be configured as a redundant system including multiple sensors, controllers and motors. Moreover, the turning control unit 19 and the steering reaction force control unit 20 may be provided separately.

In Example 1, stability control and correction steering reduction control are carried out in the aim of reducing a correction steering amount of the driver and reducing steering load. In the stability control, two feedback (F/B) controls are performed for the purpose of improving the vehicle stability against disturbances (crosswind, road surface unevenness, wheel tracks, road surface cant, and the like).

1. Yaw angle F/B control

Correcting the turning angle according to a yaw angle, which is an angle formed by the white line and the traveling direction of the own vehicle, to reduce the yaw angle generated by the disturbance.

2. Lateral position F/B control

Correcting the turning angle according to a distance (lateral position) to the white line to reduce a lateral position change that is an integral value of the yaw angle generated by the disturbance.

In the correction steering reduction control, three reaction force offset controls are performed for the purpose of improving the vehicle stability for the steering input by the driver.

1. Reaction force offset control according to lateral position

Offsetting steering reaction force characteristics corresponding to a self-aligning torque according to the lateral position in a direction in which the absolute value of the steering reaction force is increased to suppress inversion of the sign of the steering torque when the driver performs correction steering over a steering angle neutral position.

2. Reaction force offset control according to deviation margin time

Offsetting steering reaction force characteristics corresponding to a self-aligning torque according to deviation margin time (time to reach the white line) in a direction in which the absolute value of the steering reaction force is increased to suppress inversion of the sign of the steering torque when the driver performs correction steering over a steering angle neutral position.

3. Reaction force offset control according to curvature

Offsetting steering reaction force characteristics corresponding to a self-aligning torque according to the curvature of the white line in the same sign direction as the self-aligning torque to reduce maintained steering force of the driver during turning and suppress a maintained steering angle change relative to a maintained steering force change.

Figure 2:
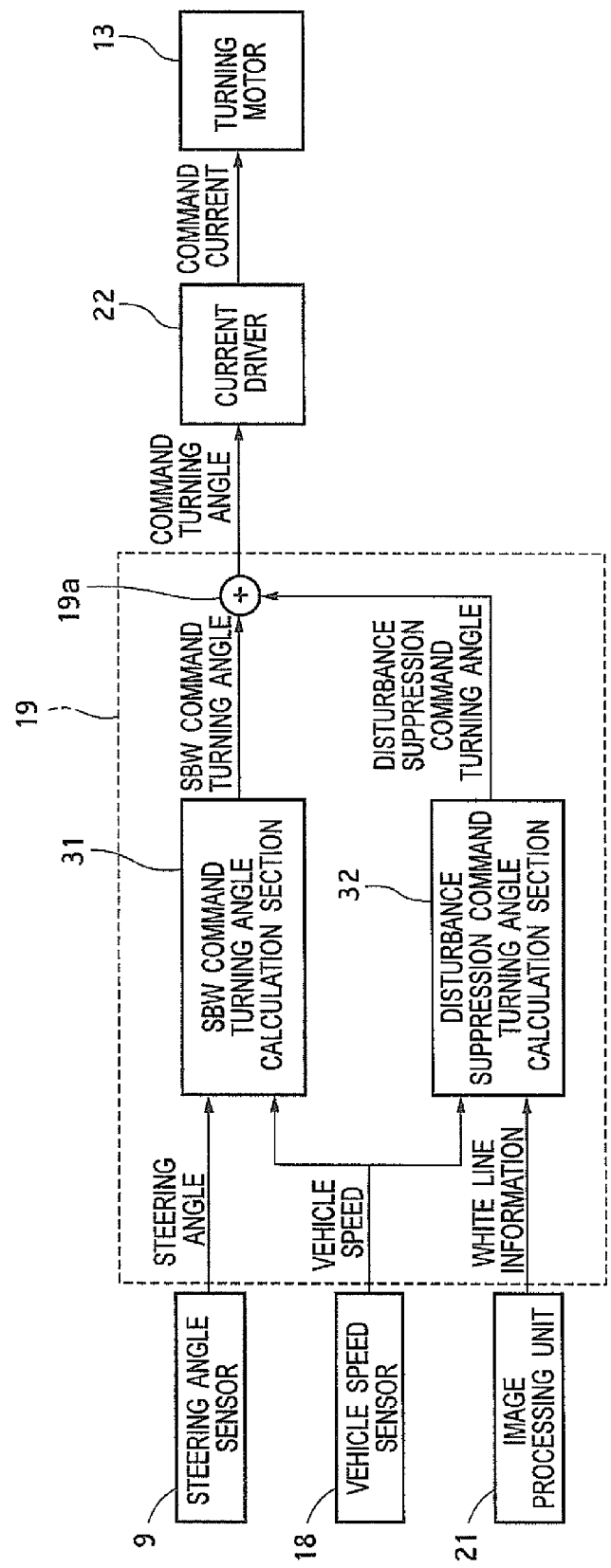
FIG. 2 is a control block diagram of a turning control unit 19.

FIG. 2 is a control block diagram of the turning control unit 19. An SBW command turning angle calculation section 31 calculates a SBW command turning angle based on the steering angle and the vehicle speed.

A disturbance suppression command turning angle calculation section 32 calculates a disturbance suppression command turning angle to correct the SBW command turning angle in the stability control based on the vehicle speed and the white line information. The disturbance suppression command turning angle calculation section 32 is described in detail later.

An adder 19a outputs a value obtained by adding up the SBW command turning angle and the disturbance suppression command turning angle to the current driver 22 as a final command turning angle.

Figure 3:
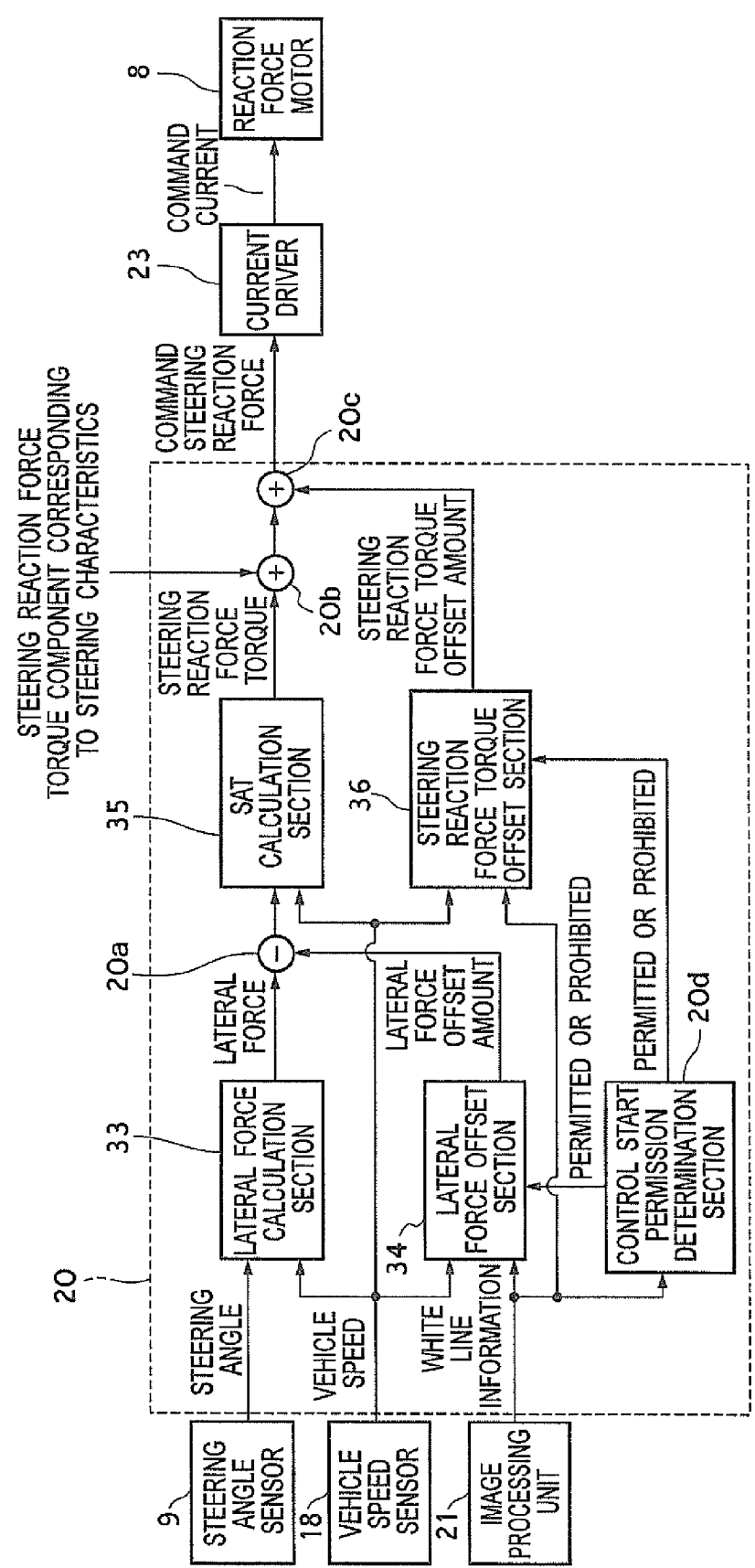
FIG. 3 is a control block diagram of a steering reaction force control unit 20.

FIG. 3 is a control block diagram of the steering reaction force control unit 20. A lateral force calculation section 33 calculates a tire lateral force, based on the steering angle and the vehicle speed, by referring to a steering angle-lateral force conversion map showing a relationship between the steering angle and the tire lateral force for each vehicle speed in a conventional steering device, which is obtained beforehand by experiment or the like. The steering angle-lateral force conversion map has the following characteristics. Specifically, the larger the steering angle, the larger the tire lateral force. Also, the smaller the steering angle, the larger the change amount of the tire lateral force relative to the change amount of the steering angle compared with the case of a larger steering angle. Moreover, the higher the vehicle speed, the smaller the tire lateral force.

A lateral force offset section 34 calculates a lateral force offset amount, based on the vehicle speed and the white line information, to offset the steering reaction force characteristics in the reaction force offset control according to the curvature. The lateral force offset section 34 is described in detail later.

A subtractor 20a subtracts the lateral force offset amount from the tire lateral force.

A SAT calculation section 35 calculates a steering reaction force torque generated by the tire lateral force, based on the vehicle speed and the tire lateral force after offset by the lateral force offset amount, by referring to a lateral force-steering reaction force torque conversion map showing a relationship between the tire lateral force and the steering reaction force torque in a conventional steering device, which is obtained beforehand by experiment or the like. The tire lateral force-steering reaction force torque conversion map has the following characteristics. Specifically, the larger the tire lateral force, the larger the steering reaction force torque. Also, the smaller the tire lateral force, the larger the change amount of the steering reaction force torque relative to the change amount of the tire lateral force compared with the case of a larger tire lateral force. Moreover, the higher the vehicle speed, the smaller the steering reaction force torque. These characteristics are obtained by simulating the reaction force generated in the steering wheel by the self-aligning torque that returns the wheels to their straight-driving state, which is generated by a road surface reaction force, in a conventional steering device.

An adder 20b adds up the steering reaction force torque and steering reaction force torque components (spring term, viscosity term and inertia term) corresponding to the steering characteristics. The spring term is a component proportional to the steering angle, and is calculated by multiplying the steering angle by a predetermined gain. The viscosity term is a component proportional to the steering angle speed, and is calculated by multiplying the steering angle speed by a predetermined gain. The inertia term is a component proportional to the steering angle acceleration, and is calculated by multiplying the steering angle acceleration by a predetermined gain.

A steering reaction force torque offset section 36 calculates a steering reaction force torque offset amount to offset the steering reaction force characteristics in the reaction force offset control according to the lateral position or the deviation margin time, based on the vehicle speed and the image of the driving road in front of the own vehicle. The steering reaction force torque offset section 36 is described in detail later.

An adder 20c outputs a value obtained by adding up the steering torque offset amount and the steering reaction force torque added with the steering reaction force torque components corresponding to the steering characteristics to the current driver 23 as a final command steering reaction force torque.

A control start permission determination section 20d permits or prohibits, based on the white line information, the start of the calculation of the lateral force offset amount by the lateral force offset section 34 and the calculation of the steering reaction force torque offset amount by the steering reaction force torque offset section 36. More specifically, the control start permission determination section 20d permits or prohibits the start of the reaction force offset control according to the curvature, the reaction force offset control according to the lateral position and the reaction force offset control according to the deviation margin time.

This is described for each of the cases below.

1. When the white lines on both left and right sides are recognized

The start of all of the reaction force offset control according to the curvature, the reaction force offset control according to the lateral position and the reaction force offset control according to the deviation margin time is permitted.

2. When the white line on one side is lost (a) In case of high recognition stability for the white line that is not lost Only the start of the reaction force offset control according to the curvature is permitted, and the start of the reaction force offset control according to the lateral position and the reaction force offset control according to the deviation margin time is prohibited.

(b) In case of low recognition stability for the white line that is not lost

The start of all of the reaction force offset control according to the curvature, the reaction force offset control according to the lateral position and the reaction force offset control according to the deviation margin time is prohibited.

3. When the white lines on the both sides are lost

The start of all of the reaction force offset control according to the curvature, the reaction force offset control according to the lateral position and the reaction force offset control according to the deviation margin time is prohibited.

[Disturbance Suppression Command Turning Angle Calculation Section]

Figure 4:
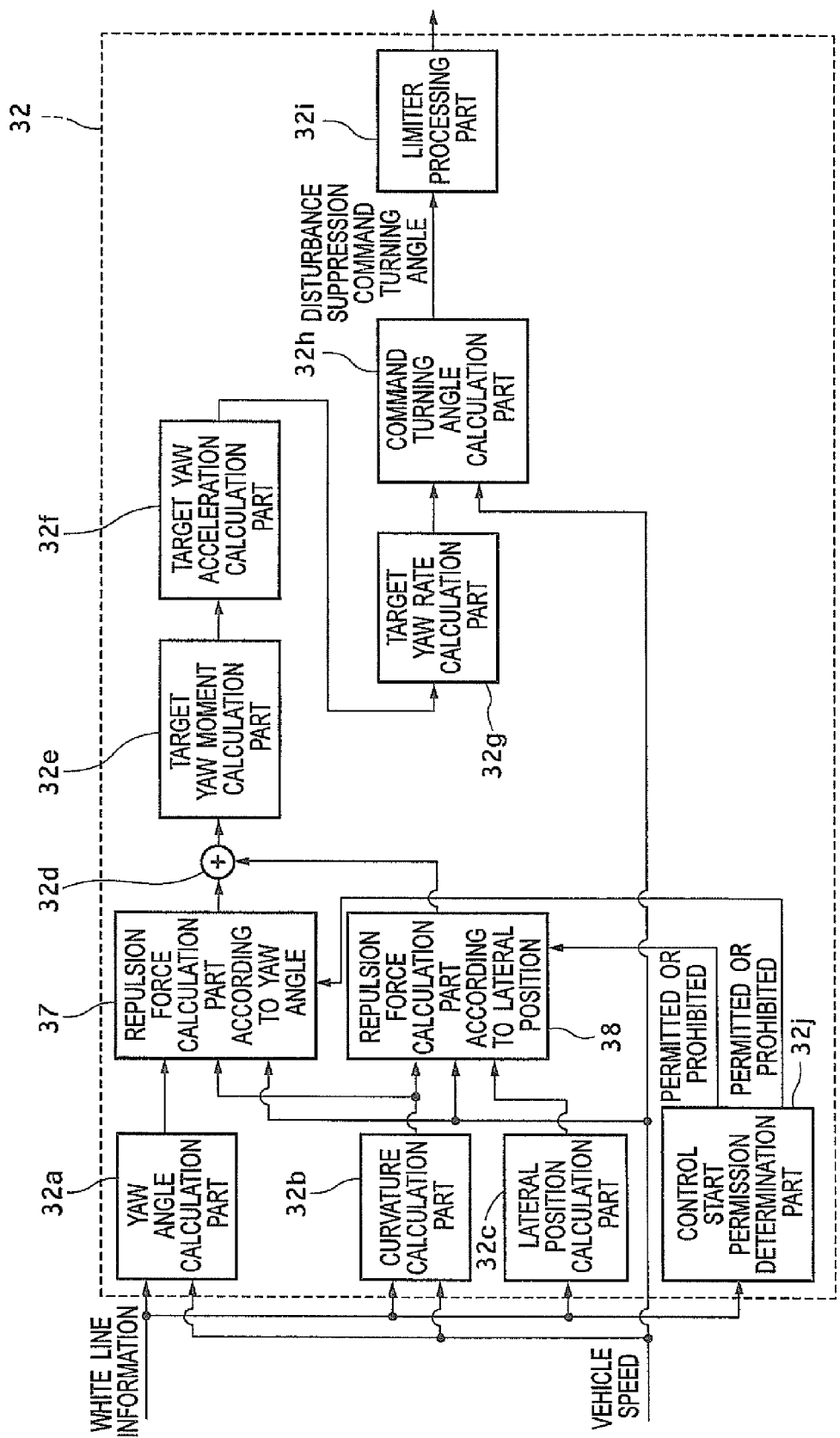
FIG. 4 is a control block diagram of a disturbance suppression command turning angle calculation section 32.

FIG. 4 is a control block diagram of the disturbance suppression command turning angle calculation section 32. A yaw angle calculation part 32a calculates a yaw angle that is an angle formed by the white line beyond a front gaze point and the traveling direction of the own vehicle. The target white line may be either one of the left and right white lines. When the white line on one side is lost, the white line that is not lost is used as the target. The yaw angle beyond the front gaze point is an angle formed by the white line and the vehicle traveling direction after a predetermined period of time (e.g., 0.5 seconds). The yaw angle can be easily and accurately detected by calculating the yaw angle based on the image of the driving road shot by the camera 17.

A curvature calculation part 32b calculates the curvature of the white line beyond the front gaze point. The target white line may be either one of the left and right white lines. When the white line on one side is lost, the white line that is not lost is used as the target.

A lateral position calculation part 32c calculates a distance to the white line beyond the front gaze point. Here, distances to the left and right white lines beyond the front gaze point are calculated, respectively, and the shorter distance is used as the distance to the white line beyond the front gaze point.

A repulsion force calculation part 37 according to the yaw angle calculates a repulsion force of the vehicle to reduce the yaw angle generated by the disturbance in the yaw angle F/B control, based on the yaw angle, the curvature and the vehicle speed. The repulsion force calculation part 37 according to the yaw angle is described in detail later.

A repulsion force calculation part 38 according to the lateral position calculates a repulsion force of the vehicle to reduce the lateral position change generated by the disturbance in the lateral position F/B control, based on the curvature, the vehicle speed and the distance to the white line beyond the front gaze point. The repulsion force calculation part 38 according to the lateral position is described in detail later.

An adder 32d calculates a lateral-direction repulsion force by adding up the repulsion force corresponding to the yaw angle and the repulsion force corresponding to the lateral position.

A target yaw moment calculation part 32e calculates a target yaw moment based on the lateral-direction repulsion force, a wheel base (inter-axle distance), a rear-wheel axle load, and a front-wheel axle load. To be more specific, a value obtained by multiplying the lateral-direction repulsion force by a ratio of the rear-wheel axle load to the vehicle weight (front-wheel axle load+rear-wheel axle load) and the wheel base is used as the target yaw moment. A target yaw acceleration calculation part 32f calculates a target yaw acceleration by multiplying the target yaw moment by a yaw inertia moment coefficient. A target yaw rate calculation part 32g calculates a target yaw rate by multiplying the target yaw acceleration by a headway.

A command turning angle calculation part 32h calculates a disturbance suppression command turning angle $\delta_{st}^*$ by referring to the following equation based on the target yaw rate $\phi^*$, the wheel base WHEEL_BASE, the vehicle speed V and the vehicle characteristic speed vCh. Here, the vehicle characteristic speed $V_{ch}$ is a parameter in the known "Ackermann's formula", and represents self-steering characteristics of the vehicle.

$$\delta_{st}^* = (\phi^* \times \text{WHEEL\_BASE} \times (1+(V/vCh)^2) \times 180)/(V \times M\_PI)$$

Note that M_PI is a predetermined coefficient.

A limiter processing part 32i limits the maximum value of the disturbance suppression command turning angle $\delta_{st}^*$ and the upper limit of the change rate. The maximum value is a turning angle range (e.g., 0.2° on the left and right sides) of the front wheels 5FL and 5FR corresponding to a range of an allowance around the neutral position when the steering angle of the steering wheel 6 is within an angle range (e.g., 3° on the left and right sides) of the allowance, in a conventional steering device (in which the steering unit is mechanically connected with the turning unit).

A control start permission determination part 32j permits or prohibits, based on the white line information, the start of the calculation of the repulsion force according to the yaw angle by the repulsion force calculation part 37 according to the yaw angle and the calculation of the repulsion force according to the lateral position by the repulsion force calculation part 38 according to the lateral position. More specifically, the control start permission determination part 32j permits or prohibits the start of the yaw angle F/B control and the lateral position F/B control. This is described for each of the cases below.

1. When the white lines on both left and right sides are recognized

Both of the yaw angle F/B control and the lateral position F/B control are permitted.

2. When the white line on one side is lost (a) In case of high recognition stability for the white line that is not lost Only the start of the yaw angle F/B control is permitted, and the start of the lateral position F/B control is prohibited.

(b) In case of low recognition stability for the white line that is not lost

The start of both of the yaw angle F/B control and the lateral position F/B control is prohibited.

3. When the white lines on the both sides are lost

The start of both of the yaw angle F/B control and the lateral position F/B control is prohibited.

Figure 5:
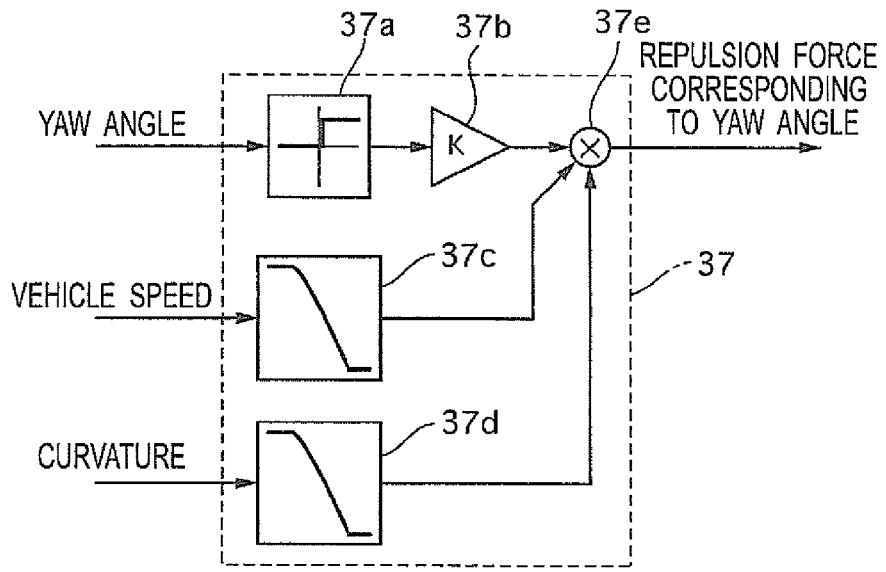
FIG. 5 is a control block diagram of a repulsion force calculation part 37 according to a yaw angle.

FIG. 5 is a control block diagram of the repulsion force calculation part 37 according to the yaw angle. An upper and lower limiter 37a performs upper and lower limitation processing on the yaw angle. When the yaw angle is larger than a predetermined yaw angle threshold (e.g., 0.1°), the upper and lower limiter sets a value (e.g., 1°) that is not less than a predetermined value that enables suppression of the disturbance and less than a value that causes the vehicle to vibrate and a value generated by steering by the driver. On the other hand, when the yaw angle is less than 0.1°, the upper and lower limiter sets 0. The yaw angle is positive when the white line intersects with the extension of the vehicle traveling direction. Moreover, the yaw angle threshold is a detection error range of the camera 17.

A yaw angle F/B gain multiplication part 37b multiplies the yaw angle after the limitation processing by a yaw angle F/B gain. The yaw angle F/B gain is not less than a predetermined value that enables responsiveness to be ensured while avoiding insufficient control amount, and less than a value that causes the vehicle to vibrate and a value at which the driver feels a shift in the neutral position between the steering angle and the turning angle.

A vehicle speed correction gain multiplication part 37c multiplies the vehicle speed by a vehicle speed correction gain. The vehicle speed correction gain has characteristics of reaching the maximum value within a range of 0 to 70 km/h, gradually decreasing within a range of 70 to 130 km/h, and reaching the minimum value (0) at 130 km/h or more.

A curvature correction gain multiplication part 37d multiplies the curvature by a curvature correction gain. The curvature correction gain has characteristics that the larger the curvature, the smaller the curvature correction gain, and sets the upper limit and lower limit (0).

A multiplier 37e obtains a repulsion force corresponding to the yaw angle by multiplying outputs from the yaw angle F/B gain multiplication part 37b, the vehicle speed correction gain multiplication part 37c and the curvature correction gain multiplication part 37d.

Figure 6:
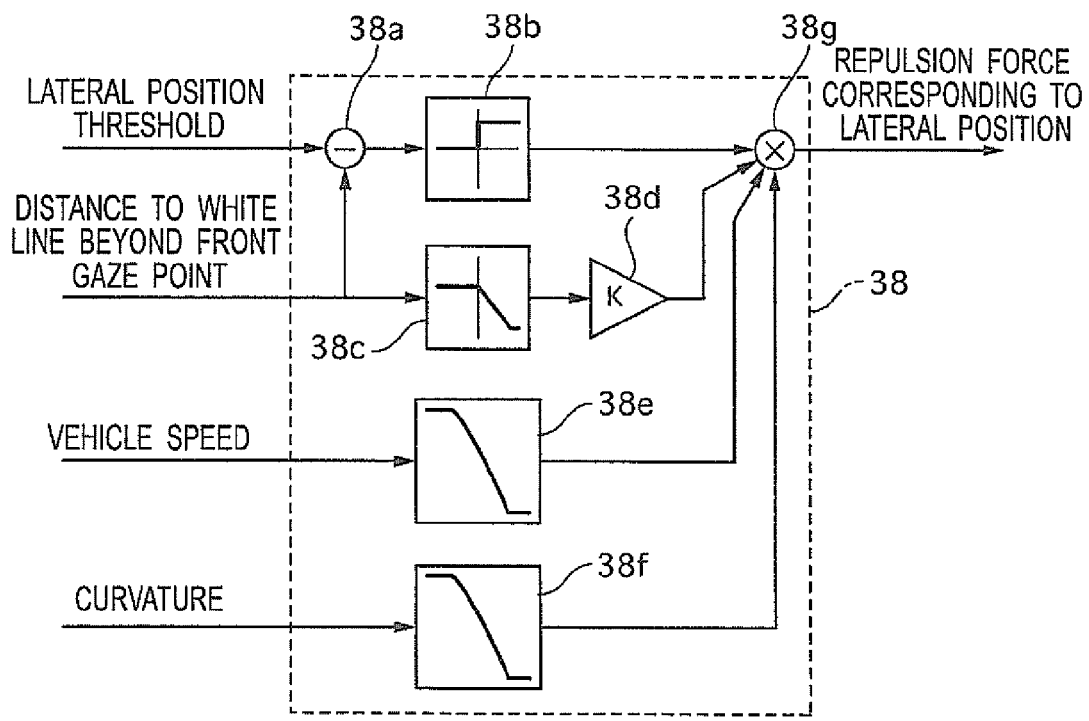
FIG. 6 is a control block diagram of a repulsion force calculation part 38 according to a lateral position.

FIG. 6 is a control block diagram of the repulsion force calculation part 38 according to the lateral position. A subtractor 38a obtains a lateral position deviation by subtracting the distance to the white line beyond the front gaze point from a preset lateral position threshold (e.g., 90 cm).

An upper and lower limiter 38b performs upper and lower limitation processing on the lateral position deviation. The upper and lower limiter takes a predetermined positive value when the lateral position deviation is a positive value, and takes 0 when the lateral position deviation is a negative value.

A distance correction gain multiplication part 38c multiplies the distance to the white line beyond the front gaze point by a distance correction gain. The distance correction gain has the following characteristics, and sets the lower limit. Specifically, the distance correction gain takes its maximum value when the distance to the white line is a predetermined value or less. Moreover, when the distance to the white line exceeds the predetermined value, the longer the distance, the smaller the distance correction gain.

A lateral position F/B gain multiplication part 38d multiplies the distance to the white line after the correction by the distance correction gain multiplication part 38c by a lateral position F/B gain. The lateral position F/B gain is not less than a predetermined value that enables responsiveness to be ensured while avoiding insufficient control amount, and less than a value that causes the vehicle to vibrate and a value at which the driver feels a shift in the neutral position. Furthermore, the lateral position F/B gain is set to a value smaller than the yaw angle F/B gain obtained by the yaw angle F/B gain calculation part 37b.

A vehicle speed correction gain multiplication part 38e multiplies the vehicle speed by a vehicle speed correction gain. The vehicle speed correction gain has characteristics of reaching the maximum value within a range of 0 to 70 km/h, gradually decreasing within a range of 70 to 130 km/h, and reaching the minimum value (0) at 130 km/h or more.

A curvature correction gain multiplication part 38f multiplies the curvature by a curvature correction gain. The curvature correction gain has characteristics that the larger the curvature, the smaller the curvature correction gain, and sets the upper limit and lower limit (0).

A multiplier 38g obtains a repulsion force corresponding to the lateral position by multiplying outputs from the lateral position F/B gain multiplication part 38d, the vehicle speed correction gain multiplication part 38e and the curvature correction gain multiplication part 38f.

Figure 7:
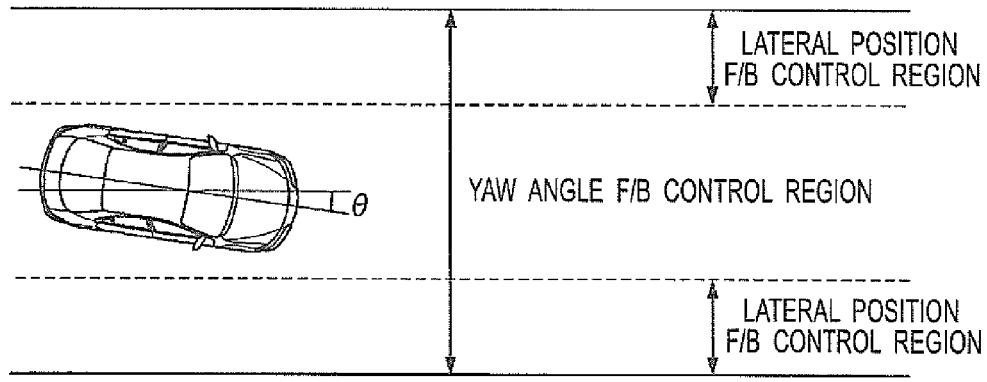
FIG. 7 is a diagram showing control regions of yaw angle F/B control and lateral position F/B control.

In Example 1, as the stability control, the yaw angle F/B control to reduce the yaw angle generated by the disturbance and the lateral position F/B control to reduce the lateral position change that is an integral value of the yaw angle generated by the disturbance are performed. FIG. 7 shows control regions of the both F/B controls. φ is the yaw angle.

The yaw angle F/B control is performed when the yaw angle exceeds the yaw angle threshold (0.1°) regardless of the lateral position. More specifically, an angle range not more than the yaw angle threshold (0.1°) that is the detection error range of the camera 17 is set as a dead zone of the yaw angle F/B control. Thus, unnecessary yaw angle F/B control associated with a yaw angle detection error can be avoided.

The lateral position F/B control is performed when the distance to the white line reaches a predetermined lateral position threshold (90 cm) or less. More specifically, the vicinity of the center of the driving lane where the distance from the left and right white lines exceeds 90 cm is set as a dead zone of the lateral position F/B control. Thus, unnecessary lateral position F/B control can be prevented from being initiated in the center of the driving lane.

Figure 8:
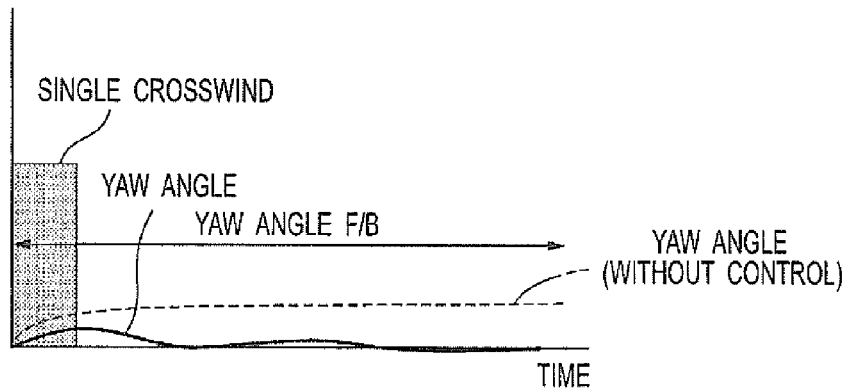
FIG. 8 is a time chart showing changes in the yaw angle when the vehicle driving on a straight road of a highway receives single crosswind.

FIG. 8 is a time chart showing changes in the yaw angle when the vehicle driving on a straight road of a highway receives single crosswind. It is assumed that the vehicle is driving near the center of the driving lane. When the vehicle receives single crosswind and a yaw angle is generated, the yaw angle F/B control is performed, in which a repulsion force corresponding to the yaw angle is calculated, a disturbance suppression command turning angle is calculated to obtain the repulsion force, and the SBW command turning angle based on the steering angle and the vehicle speed is corrected.

When the vehicle is driven along the driving lane, the direction of the white lines coincides with the vehicle traveling direction particularly on the straight road. Thus, the yaw angle becomes zero. More specifically, in the yaw angle F/B control according to Example 1, the generated yaw angle is considered to be one generated by the disturbance. Therefore, by reducing the yaw angle, the vehicle stability against the disturbance particularly during the straight-driving state can be improved. As a result, a correction steering amount by the driver can be reduced.

As a technology of suppressing the influence of disturbance such as crosswind on vehicle behavior, there has heretofore been known a technology of applying a turning torque for suppressing the disturbance to a steering system in a conventional steering device. As for the SBW system, there has been known a technology of applying a steering reaction force component that encourages turning for suppressing the disturbance to the steering wheel. However, in such conventional steering devices, variations in the steering reaction force cause the driver to feel discomfort.

On the other hand, the stability control including the yaw angle F/B control according to Example 1 focuses on the point that the steering wheel 6 and the front wheels 5L and 5R can be controlled independently of each other, which is one of the characteristics of the SBW system in which the steering wheel 6 and the front wheels 5L and 5R are mechanically uncoupled from each other. In the stability control, the turning angle of the front wheels 5L and 5R is controlled based on the command turning angle obtained by adding up the SBW command turning angle corresponding to the steering angle and the vehicle speed and the disturbance suppression command turning angle corresponding to the yaw angle. Moreover, the tire lateral force is estimated based on the steering angle and the vehicle speed, and the steering reaction force is controlled based on the command steering reaction force corresponding to the estimated tire lateral force and the vehicle speed.

More specifically, since the disturbance suppression turning angle is applied directly to the front wheels 5L and 5R, it is no longer required to apply the steering reaction force component that encourages turning to suppress the disturbance. Furthermore, by applying the steering reaction force corresponding to the tire lateral force estimated from the steering angle, variations in the tire lateral force caused by the turning to suppress the disturbance are not reflected on the steering reaction force. Thus, the sense of discomfort experienced by the driver can be reduced. In the conventional SBW system, the tire lateral force is estimated from a rack axial force detected by a sensor or the turning angle, and a steering reaction force corresponding to the estimated tire lateral force is applied. Therefore, variations in the tire lateral force caused by the turning to suppress the disturbance are always reflected on the steering reaction force, resulting in a sense of discomfort experienced by the driver. Meanwhile, in Example 1, only the tire lateral force caused by steering by the driver is reflected on the steering reaction force, and the turning for disturbance suppression causes no variations in the steering reaction force. Thus, the sense of discomfort experienced by the driver can be reduced.

Here, when the disturbance suppression turning angle is applied directly to the front wheels 5L and 5R, a shift in the neutral position between the steering angle and the turning angle becomes a problem. However, in Example 1, the disturbance suppression command turning angle is set within the turning angle range (0.2° on the left and right sides) of the front wheels 5FL and 5FR corresponding to the range of the allowance around the neutral position of the steering angle when the steering wheel 6 is located within the angle range (3° on the left and right sides) of the allowance, in a conventional steering device. The generation of the yaw angle by the disturbance is more significant in the straight-driving state than in the turning state. In the straight-driving state, the steering angle is located in the vicinity of the neutral position of the steering angle. More specifically, in many cases, the correction of the turning angle by the yaw angle F/B control is performed in the vicinity of the steering angle neutral position. Therefore, the neutral position shift amount between the steering angle and the turning angle associated with the application of the disturbance suppression command turning angle is suppressed within the range of the allowance of steering. Thus, a sense of discomfort caused by the shift in the neutral position can be suppressed.

Moreover, since the disturbance suppression command turning angle is limited within the range of 0.2° on the left and right sides, the driver can change the vehicle traveling direction to a desired direction by steering input even during the stability control. More specifically, the correction amount of the turning angle by the disturbance suppression command turning angle is minute compared with the amount of change in the turning angle caused by the steering input by the driver. Thus, the vehicle stability against the disturbance can be improved without hindering the steering by the driver.

As control of lateral movement of the vehicle, there have heretofore been known lane departure prevention control in which a yaw moment to prevent the vehicle from departing from the lane is applied to the vehicle when it is detected that the vehicle has a tendency to depart from the driving lane as well as lane keep control in which a yaw moment is applied to the vehicle so that the vehicle travels near the center of the driving lane. However, the lane departure prevention control is control having a control intervention threshold, and is not initiated near the center of the driving lane. Therefore, the vehicle stability against the disturbance cannot be ensured. Moreover, the threshold intervenes in the control even when the driver wishes to pull over the vehicle to the side of the driving lane. This causes the driver to feel irritated. Meanwhile, the lane keep control is control having a target position (target line), and can ensure the vehicle stability against the disturbance. However, in the lane keep control, the vehicle cannot be driven in a line that deviates from the target line. In addition, reduction in force of the driver gripping the steering wheel is determined to be a hands-free state, and thus the control is cancelled. Therefore, the driver needs to always grip the steering wheel with a certain amount of force or more. This results in a large steering load on the driver.

On the other hand, the yaw angle F/B control according to Example 1 has no control intervention threshold, and thus can realize a seamless control to always ensure the stability against the disturbance. Furthermore, the yaw angle F/B control has no target position, and thus allows the driver to drive the vehicle in a desired line. In addition, the control is not cancelled even when the steering wheel 6 is lightly gripped. The steering load on the driver can be reduced.

Figure 9:
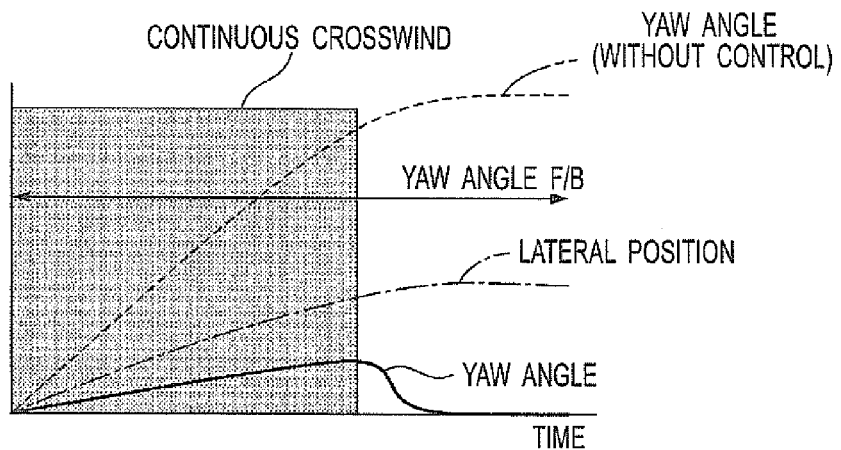
FIG. 9 is a time chart showing changes in the yaw angle and lateral position when the lateral position F/B control is not performed in the case where the vehicle driving on a straight road of a highway receives continuous crosswind.

FIG. 9 is a time chart showing changes in the yaw angle and lateral position when the lateral position F/B control is not performed in the case where the vehicle driving on a straight road of a highway receives continuous crosswind. It is assumed that the vehicle is driving near the center of the driving lane. When the vehicle receives continuous crosswind and a yaw angle is generated, the yaw angle is reduced by the yaw angle F/B control, but the vehicle strays to the side due to the continuous disturbance. This is because the yaw angle F/B control is to reduce the yaw angle, and the turning angle is not corrected when the yaw angle is zero. Therefore, the lateral position change that is the integral value of the yaw angle generated by the disturbance cannot be directly reduced. Note that the lateral position change can be indirectly suppressed (increase in the integral value of the yaw angle can be suppressed) by setting a large value as the repulsion force corresponding to the yaw angle. However, the maximum value of the disturbance suppression command turning angle is limited to 0.2° on the left and right sides so as not to cause the driver to feel discomfort. Thus, it is difficult to effectively prevent the vehicle from straying to the side only by performing the yaw angle F/B control. Furthermore, the yaw angle F/B gain to obtain the repulsion force corresponding to the yaw angle requires convergence of the yaw angles before the driver notices changes in the yaw angle, and thus takes a maximum value, which on the other hand, causes the vehicle to vibrate as it is. Therefore, the yaw angle by which the yaw angle F/B gain is multiplied is limited to the upper limit (1°) or less by the upper and lower limiter 37a. More specifically, the repulsion force corresponding to the yaw angle is a repulsion force corresponding to a yaw angle smaller than an actual yaw angle. This can also explain that it is difficult to effectively prevent the vehicle from straying to the side only by performing the yaw angle F/B control.

Figure 10:
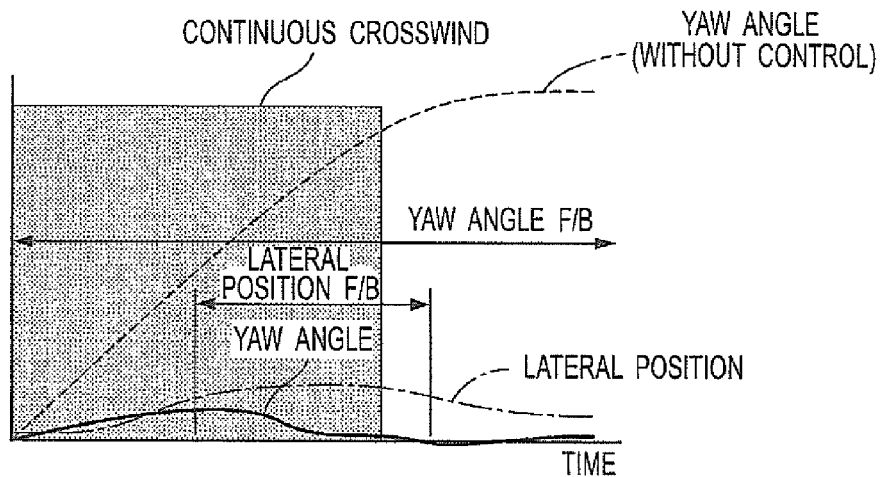
FIG. 10 is a time chart showing changes in the yaw angle and lateral position when the lateral position F/B control is performed in the case where the vehicle driving on a straight road of a highway receives continuous crosswind.

Therefore, in the stability control according to Example 1, the lateral position F/B control is introduced to prevent the vehicle from straying to the side due to steady disturbance. FIG. 10 is a time chart showing changes in the yaw angle and lateral position when the lateral position F/B control is performed in the case where the vehicle driving on a straight road of a highway receives continuous crosswind. In the lateral position F/B control, a repulsion force corresponding to a lateral position change (≈yaw angle integral value) is calculated when the vehicle driving near the center of the driving lane receives continuous crosswind and strays to the side, and the distance to the white line becomes a lateral position threshold or less. The disturbance suppression command turning angle calculation section 32 corrects the SBW command turning angle by calculating the disturbance suppression command turning angle based on the lateral direction repulsion force obtained by adding up the repulsion force corresponding to the lateral position and the repulsion force corresponding to the yaw angle. More specifically, in the lateral position F/B control, the SBW command turning angle is corrected using the disturbance suppression command turning angle corresponding to the lateral position. Thus, the lateral position change caused by the steady disturbance can be directly reduced, and the vehicle can be prevented from straying to the side. In other words, the vehicle driving position, for which the yaw angle F/B control is performed, can be returned to the vicinity of the center of the driving lane, which is the dead zone of the lateral position F/B control.

As described above, the stability control according to Example 1 can improve the vehicle stability against both transient and steady disturbances by performing the yaw angle F/B control to reduce the yaw angle change caused by the transient disturbance and performing the lateral position F/B control to reduce the yaw angle integral value (lateral position change) caused by the steady disturbance.

Furthermore, in the stability control according to Example 1, the vehicle behavior caused by the control (application of the disturbance suppression command turning angle) is limited to an extent not noticed by the driver and to an extent not inhibiting a vehicle behavior change caused by steering by the driver. Also, a change in self-aligning torque caused by the control is not reflected on the steering reaction force. Thus, the stability control can be performed without making the driver aware of the stability control being executed. As a result, the behavior of the vehicle having vehicle body specifications as if the vehicle has excellent stability against disturbance can be simulated.

Note that the lateral position F/B gain to obtain the repulsion force corresponding to the lateral position in the lateral position F/B control is set to have a value smaller than the yaw angle F/B gain. As described above, the yaw angle F/B control is required to have high responsiveness because of the need to converge the yaw angles before the driver perceives the yaw angle change caused by transient disturbance. On the other hand, the lateral position F/B control is required to stop an increase in the lateral position change, and it takes time for the lateral position to change due to accumulation of the yaw angle integral values. Thus, the lateral position F/B control does not need responsiveness as high as that of the yaw angle F/B control. In addition, if the lateral position F/B gain is increased, the control amount varies significantly depending on the degree of the disturbance, causing the driver to feel discomfort.

Figure 11:
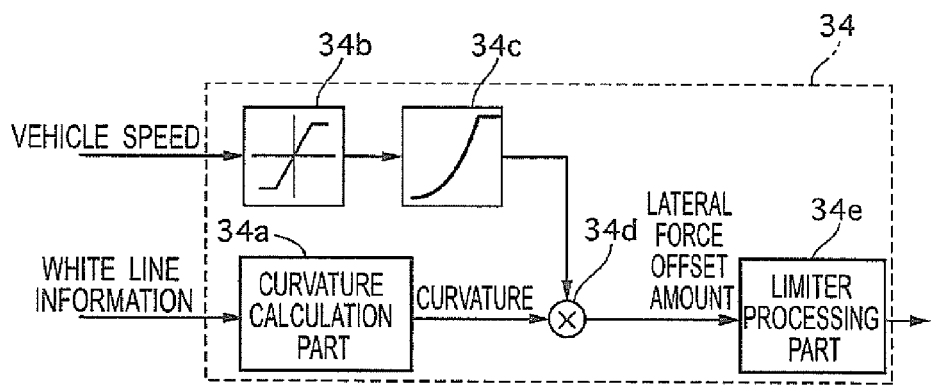
FIG. 11 is a control block diagram of a lateral force offset section 34.

FIG. 11 is a control block diagram of the lateral force offset section 34. A curvature calculation part 34a calculates a curvature of the white line beyond the front gaze point. The target white line may be either one of the left and right white lines. When the white line on one side is lost, the white line that is not lost is used as the target. An upper and lower limiter 34b performs upper and lower limitation processing on the vehicle speed. A SAT gain calculation part 34c calculates a SAT gain corresponding to the vehicle speed, based on the vehicle speed after the limitation processing. The SAT gain has characteristics that the higher the vehicle speed, the larger the gain, and sets the upper limit. A multiplier 34d obtains a lateral force offset amount by multiplying the SAT gain by the curvature. A limiter processing part 34e limits the maximum value of the lateral force offset amount and the upper limit of the change rate. For example, the maximum value is 1,000 N and the upper limit of the change rate is 600 N/s.

Figure 12:
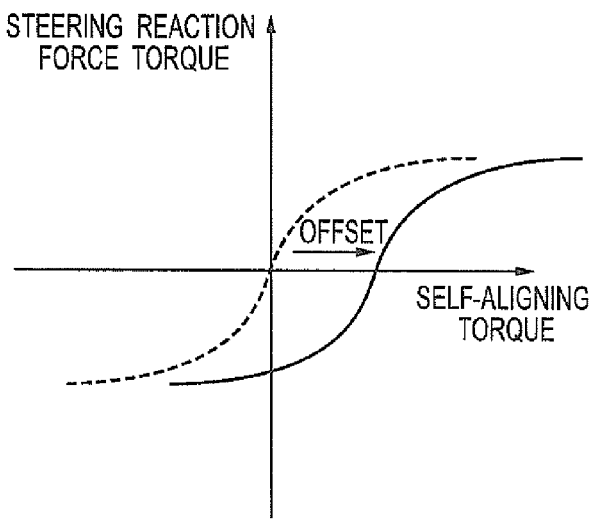
FIG. 12 is a diagram showing a state where steering reaction force characteristics indicating steering reaction force torque corresponding to a self-aligning torque are offset in the same sign direction as the self-aligning torque.

In the reaction force offset control according to the curvature, the lateral force offset amount that increases with an increase in the curvature of the white line is obtained, and the obtained lateral force offset amount is subtracted from the tire lateral force. Thus, steering reaction force characteristics representing the steering reaction force torque corresponding to the tire lateral force calculated by the SAT calculation section 35, i.e., the steering reaction force torque corresponding to the self-aligning torque are offset in the same sign direction as the self-aligning torque as the curvature of the white line is increased, as shown in FIG. 12. Note that FIG. 12 shows the case of a right-hand curve and, in the case of a left-hand curve, the steering reaction force characteristics are offset in a direction opposite to that shown in FIG. 12.

Figure 13:
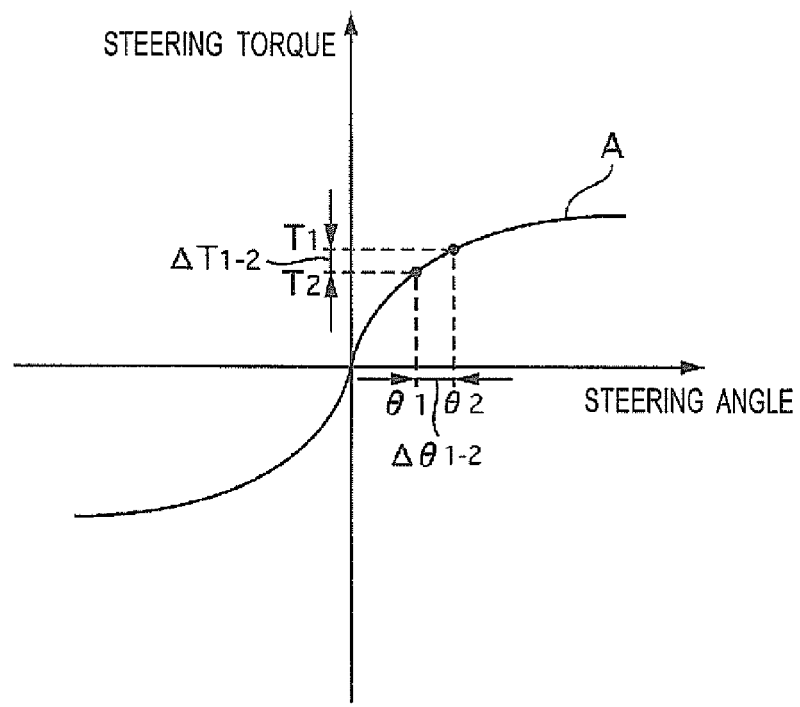
FIG. 13 is a characteristic diagram showing a relationship between a steering angle of a steering wheel and a steering torque of a driver.

Conventionally, in the SBW system in which the steering unit and the turning unit are mechanically uncoupled from each other, steering reaction force characteristics are set to simulate the steering reaction force corresponding to the self-aligning torque in the conventional steering device, and the steering reaction force is applied to the steering wheel based on the steering reaction force characteristics. In this event, the relationship between the steering angle of the steering wheel and the steering torque of the driver has characteristic A as shown in FIG. 13. More specifically, the larger the absolute value of the steering angle, the larger the absolute value of the steering torque. Also, the smaller the absolute value of the steering angle, the larger the change amount of the steering torque relative to the change amount of the steering angle compared with the case of a larger absolute value.

Here, a case is considered where the driver changes the maintained steering torque to correct the course during turning. In FIG. 13, the maintained steering torque is reduced to $T_2$ from a state where the driver maintains a steering angle $\theta_1$ with a maintained steering torque $T_1$, the steering angle becomes $\theta_2$ and the turning angle of the front wheels 5L and 5R is reduced by the reduction in the steering angle. In this event, according to the steering reaction force characteristics in the SBW system described above, the larger the curvature of the curve, the larger the change in the steering angle relative to the change in the maintained steering torque. More specifically, the larger the curvature of the curve, the higher the sensitivity of the vehicle to the steering torque. This leads to a problem of difficulty in correcting the course.

Figure 14:
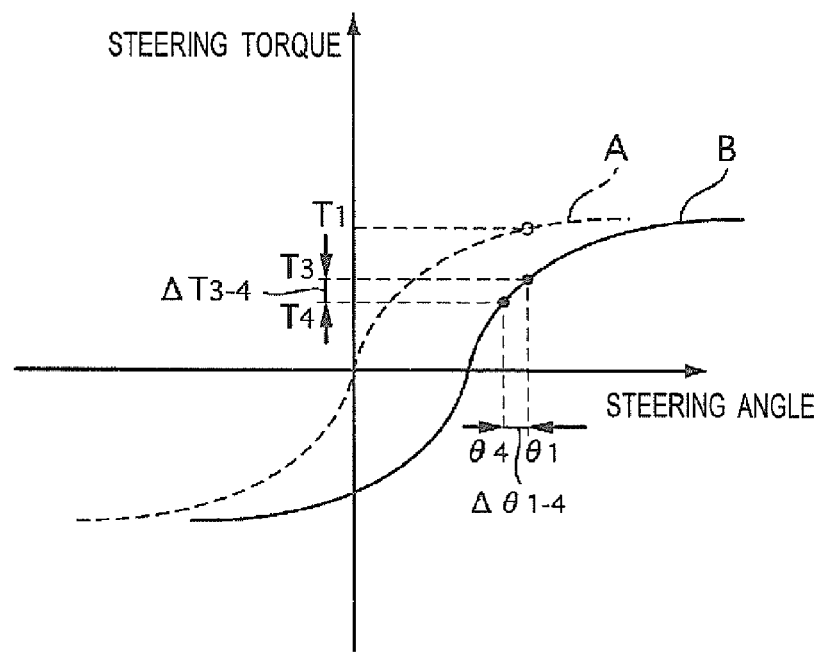
FIG. 14 is a diagram showing a state where characteristics indicating a relationship between the steering angle of the steering wheel and the steering torque of the driver are changed by offsetting the steering reaction force characteristics indicating the steering reaction force torque corresponding to the self-aligning torque in the same direction as the self-aligning torque.

Meanwhile, in the reaction force offset control according to the curvature in Example 1, with an increase in the curvature of the white line, the steering reaction force characteristics indicating the steering reaction force torque corresponding to the self-aligning torque are offset in the same sign direction as the self-aligning torque. Accordingly, the characteristics indicating the relationship between the steering angle and the steering torque are offset in the same sign direction as the steering angle as shown in FIG. 14, and are changed from characteristic A to characteristic B. Thus, the larger the curvature of the white line, the smaller the change in the steering angle relative to the change in the maintained steering torque. Even when the driver reduces the maintained steering torque to T4 and the reduction amount $\Delta T_{3-4}$ of the maintained steering torque is the same as the reduction amount $\Delta T_{1-2}$ in the conventional technology shown in FIG. 13, the reduction amount $\Delta \theta_{1-4}$ of the steering angle becomes smaller than the reduction amount $\Delta \theta_{1-2}$ in the conventional technology. More specifically, the larger the curvature of the curve, the smaller the change in the steering angle can be relative to the change in the maintained steering torque. Therefore, the sensitivity of the vehicle to the steering torque can be reduced. Thus, the vehicle behavior change becomes gradual, and the driver can more easily correct the course. Moreover, the maintained steering torque $T_3$ ($<T_1$) to maintain the steering angle $\theta_1$ can be reduced to be smaller than that in the conventional technology. Thus, the steering load on the driver during turning can be reduced.

There has heretofore been known a technology of reducing the slope of the steering reaction force characteristics along with the increased curvature of the white line, for the purpose of reducing the steering load on the driver during turning. However, in the conventional technology, the larger the curvature, the larger the change in the steering angle relative to the change in the maintained steering torque. As a result, the sensitivity of the vehicle to the steering torque is increased. More specifically, by offsetting the steering reaction force characteristics in the same direction as the self-aligning torque according to the curvature of the white line, the steering load on the driver during turning can be reduced and, at the same time, the course correction can be facilitated.

Figure 15:
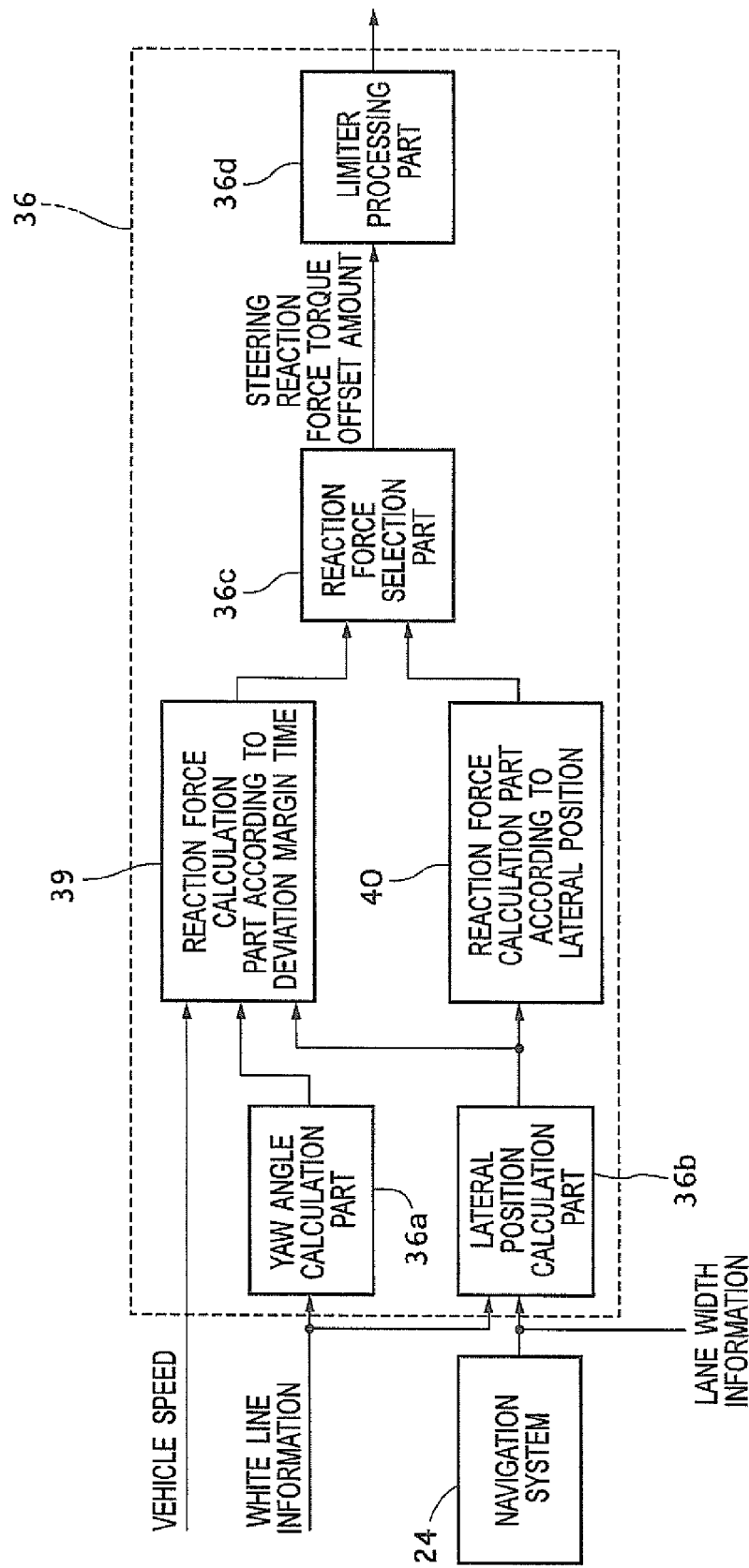
FIG. 15 is a control block diagram of a steering reaction force torque offset section 36.

FIG. 15 is a control block diagram of the steering reaction force torque offset section 36. A yaw angle calculation part 36a calculates a yaw angle beyond the front gaze point. The target white line may be either one of the left and right white lines. When the white line on one side is lost, the white line that is not lost is used as the target. The yaw angle can be easily and accurately detected by calculating the yaw angle based on the image of the driving road shot by the camera 17.

A lateral position calculation part 36b calculates lateral positions relative to the left and right white lines beyond the front gaze point and lateral positions relative to the left and right white lines at the current position. Here, when the own vehicle moves across the white line to the next driving lane, i.e., when a lane change is made, the lateral position calculation part 36b switches between the lateral positions relative to the left and right white lines at the current position. More specifically, the lateral position relative to the left white line before the white line is reached is switched to the lateral position relative to the right white line after the white line is reached. Also, the lateral position relative to the right white line before the white line is reached is switched to the lateral position relative to the left white line after the white line is reached. Note that, when a lane change is made to a driving lane having a different lane width, the lateral positions are corrected by multiplying the switched lateral position by a value $W_2/W_1$ obtained by dividing a lane width $W_2$ of the driving lane after the lane change by a lane width $W_1$ of the driving lane before the lane change. Here, lane width information of each driving lane is acquired from the navigation system 24.

A reaction force calculation part 39 according to the deviation margin time calculates a reaction force corresponding to the deviation margin time, based on the vehicle speed, the yaw angle, lateral positions relative to the left and right white lines beyond the front gaze point. A reaction force calculation part 39 according to deviation margin time is described in detail later.

A reaction force calculation part 40 according to the lateral position calculates a reaction force corresponding to the lateral position, based on the lateral positions relative to the left and right white lines at the current position. The reaction force calculation part 40 according to the lateral position is described in detail later.

A reaction force selection part 36c selects the reaction force having a larger absolute value between the reaction force corresponding to the deviation margin time and the reaction force corresponding to the lateral position, as a steering reaction force torque offset amount.

A limiter processing part 36d limits the maximum value of the steering reaction force torque offset amount and the upper limit of the change rate. For example, the maximum value is 2 Nm and the upper limit of the change rate is 10 Nm/s.

Figure 16:
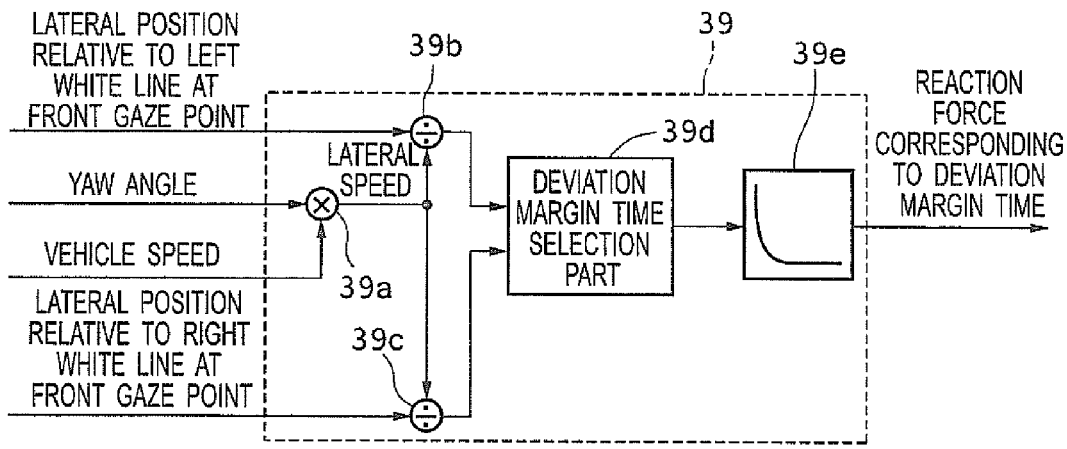
FIG. 16 is a control block diagram of a reaction force calculation part 39 according to deviation margin time.

FIG. 16 is a control block diagram of the reaction force calculation part 39 according to the deviation margin time. A multiplier 39a obtains a lateral speed of the vehicle by multiplying the yaw angle by the vehicle speed. A divider 39b obtains a deviation margin time for the left white line by dividing the lateral position relative to the left white line beyond the front gaze point by the lateral speed. A divider 39c obtains a deviation margin time for the right white line by dividing the lateral position relative to the right white line beyond the front gaze point by the lateral speed. A deviation margin time selection part 39d selects the shorter deviation margin time between the deviation margin times for the left and right white lines, as the deviation margin time.

A reaction force calculation part 39e according to the deviation margin time calculates a reaction force corresponding to the deviation margin time, based on the deviation margin time. The reaction force corresponding to the deviation margin time is inversely proportional to the deviation margin time (proportional to the reciprocal of the deviation margin time), and has characteristics of becoming almost zero in 3 seconds or more.

Figure 17:
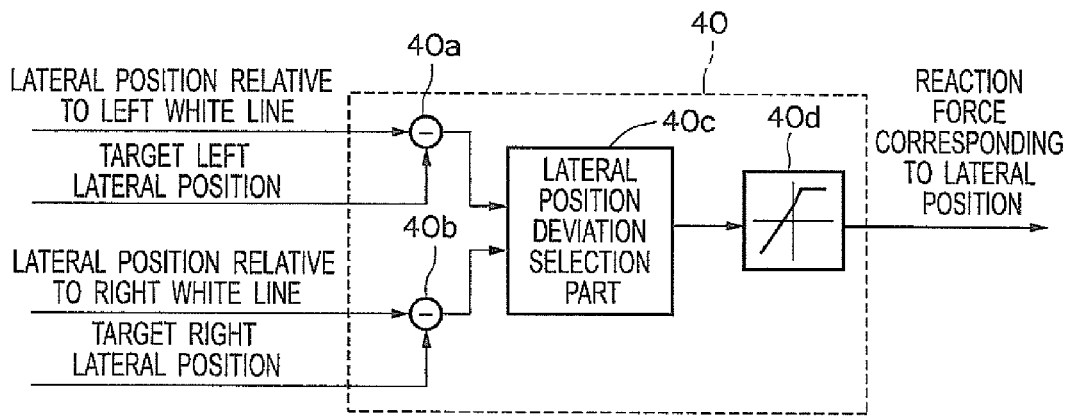
FIG. 17 is a control block diagram of a reaction force calculation part 40 according to the lateral position.

FIG. 17 is a control block diagram of the reaction force calculation part 40 according to the lateral position. A subtractor 40a obtains a lateral position deviation relative to the left lane by subtracting the lateral position relative to the left lane from a preset target left lateral position (e.g., 90 cm). A subtractor 40b obtains a lateral position deviation relative to the right lane by subtracting the lateral position relative to the right lane from a preset target right lateral position (e.g., 90 cm). A lateral position deviation selection part 40c selects the larger lateral position deviation between the lateral position deviations relative to the left and right lanes as the lateral position deviation.

A reaction force calculation part 40d according to the lateral position deviation calculates a reaction force corresponding to the lateral position, based on the lateral position deviation. The reaction force corresponding to the lateral position has characteristics that the larger the lateral position deviation, the larger the reaction force, and sets the upper limit.

Figure 18:
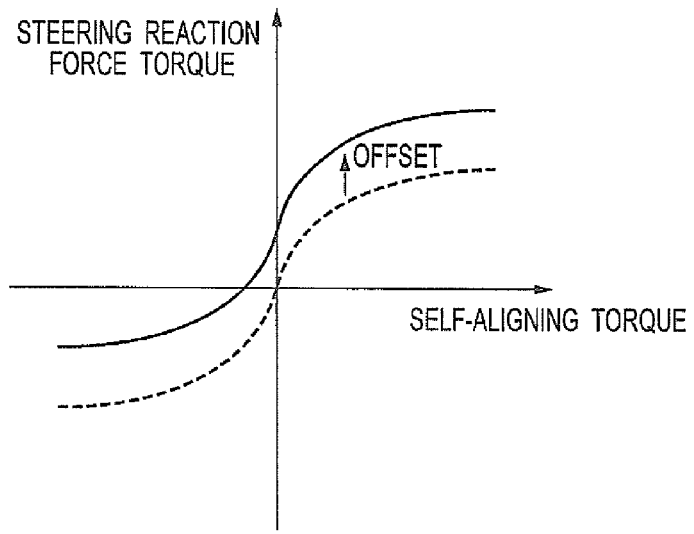
FIG. 18 is a diagram showing a state where the steering reaction force characteristics indicating the steering reaction force torque corresponding to the self-aligning torque are offset in a direction in which the absolute value of the steering reaction force torque is increased.

In the reaction force offset control according to the lateral position, the reaction force corresponding to the lateral position is added, as the steering reaction force torque offset amount, to the steering reaction force torque. Accordingly, the steering reaction force characteristics indicating the steering reaction force torque corresponding to the self-aligning torque are offset in a direction in which the absolute value of the steering reaction force torque is increased with a reduction in the distance to the white line, as shown in FIG. 18. Note that FIG. 18 shows the case where the vehicle is closer to the right lane and, in the case where the vehicle is closer to the left lane, the steering reaction force characteristics are offset in a direction opposite to that shown in FIG. 18.

Figure 19:
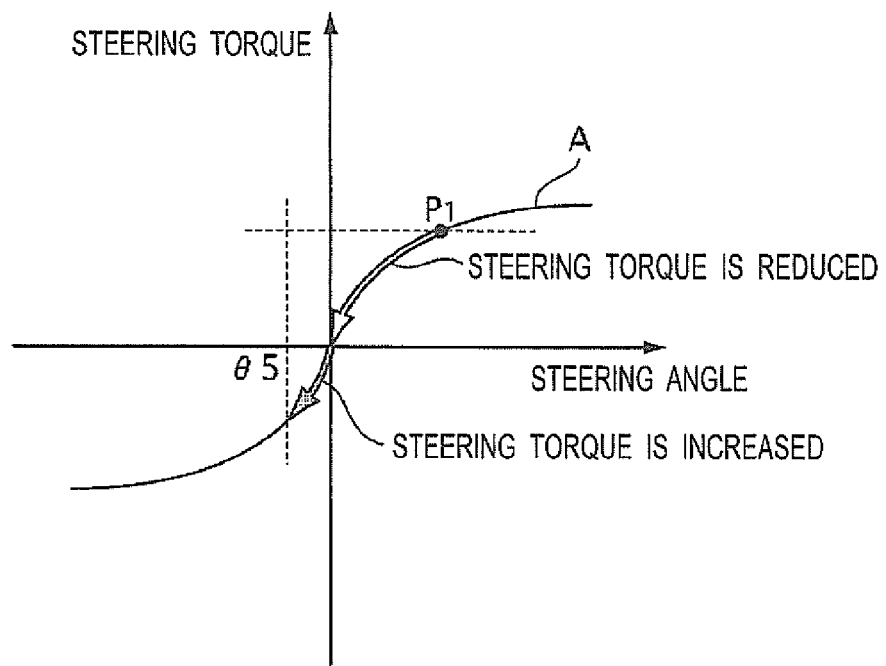
FIG. 19 is a characteristic diagram showing a relationship between the steering angle of the steering wheel and the steering torque of the driver.

Here, a case is considered where, in the conventional steering reaction force control, a sudden rightward turning operation by the driver shifts the vehicle driving position to the right and then the driver performs corrective steering to return the driving position to the vicinity of the center of the driving lane. It is assumed that the steering angle and steering torque when the sudden operation is performed by the driver are at the position of point $P_1$ on characteristic A in FIG. 19. Characteristic A is a characteristic indicating a relationship between the steering angle and the steering torque when the steering reaction force characteristics are set by simulating a conventional steering device, as in the case of FIG. 13. In order to return the driving position to the vicinity of the center of the driving lane from this state, the front wheels need to be turned to the left. Thus, the driver performs a turning back operation to the steering angle neutral position and then performs a turning operation from the steering angle neutral position, thereby aligning the steering wheel with the target angle $\theta_5$. In this event, in the conventional technology, the steering angle neutral position (steering angle zero point) coincides with the steering torque neutral position (steering torque zero point). Thus, the steering torque needs to be reduced up to the steering angle neutral position and then increased when the driving position exceeds the steering angle neutral position. More specifically, in the case of performing corrective steering over the steering angle neutral position, the sign of the steering torque is inverted, and a direction of controlling the force by the driver is switched. Moreover, the change amount of the steering angle relative to the change amount of the steering torque is significantly small in the vicinity of the steering torque neutral position compared with the other steering angle regions. Therefore, the steering load on the driver is large, and it is difficult to control the steering wheel at the target angle $\theta_S$. Thus, the vehicle driving position is likely to be overshot, leading to a problem of increased corrective steering amount.

Figure 20:
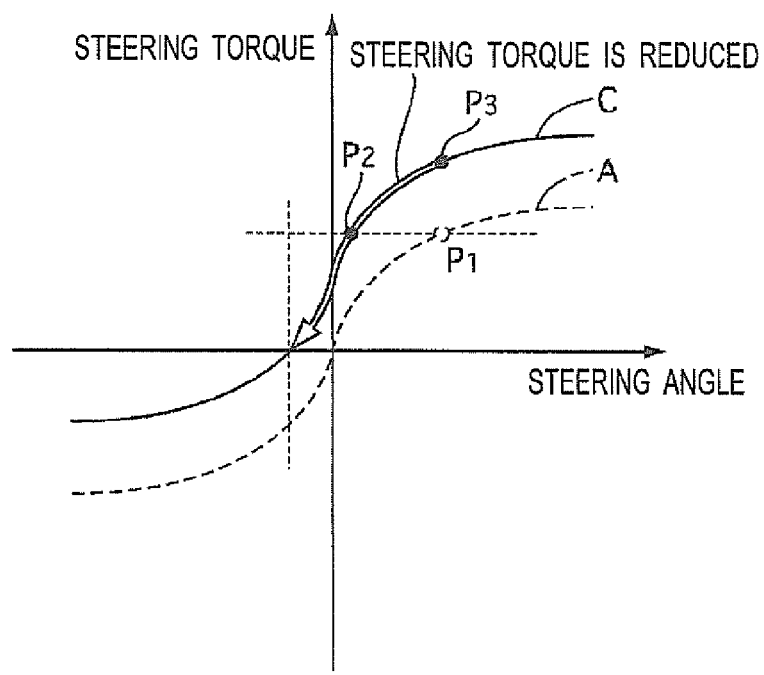
FIG. 20 is a diagram showing a state where characteristics indicating a relationship between the steering angle of the steering wheel and the steering torque of the driver are changed by offsetting the steering reaction force characteristics indicating the steering reaction force torque corresponding to the self-aligning torque in the direction in which the absolute value of the steering reaction force torque is increased.

On the other hand, in the reaction force offset control according to the lateral position in Example 1, the steering reaction force torque corresponding to the self-aligning torque is offset in the direction in which the absolute value of the steering reaction force torque is increased, with a reduction in the distance to the white line. As a result, the characteristics indicating a relationship between the steering angle and the steering torque are offset in a direction in which the absolute value of the steering torque is increased, as shown in FIG. 20, and continuously changed from characteristic A to characteristic C as the distance to the white line is reduced. In this event, in order to maintain the steering angle, the steering torque needs to be increased. If the steering torque is constant, the steering wheel 6 is gradually returned to the steering angle neutral position (point $P_1$ to point $P_2$). Thus, the vehicle driving position can be prevented from being shifted to the right by a sudden turning operation by the driver. On the other hand, when the steering angle is maintained by the driver, the steering angle and the steering torque are moved from point $P_1$ to point $P_3$. When the driver performs corrective steering from this state, the sign of the steering torque is not inverted until the vehicle driving position reaches the steering torque neutral position during a turning operation from the steering angle neutral position, since the steering torque neutral position is offset to the turning side than the steering angle neutral position in characteristic C. Therefore, the driver can control the turning angle of the front wheels 5L and 5R just by reducing the steering torque and stopping the rotation of the steering wheel 6 when the steering wheel 6 comes to the target angle. More specifically, in the reaction force offset control according to the lateral position in Example 1, the direction of controlling the force by the driver is not likely to be switched. Thus, the corrective steering by the driver can be facilitated. As a result, the vehicle driving position becomes less likely to be overshot, and thus the corrective steering amount can be reduced.

There has heretofore been known a technology of increasing a steering reaction force to such an extent as to come closer to the white line for the purpose of suppressing a shift in a driving position due to a sudden operation by a driver. In the conventional technology, the steering wheel is just increased in weight as the driving position approaches the white line. Since the steering torque neutral position in the steering reaction force characteristics always coincides with the steering angle neutral position, the sign of the steering torque is inverted in the corrective steering over the steering angle neutral position. As a result, the steering load on the driver is not reduced. More specifically, suppression of the shift in the driving position and reduction in the steering load on the driver can be both realized by offsetting the steering reaction force torque corresponding to the self-aligning torque in a direction in which the absolute value of the steering reaction force torque is increased, as the distance to the white line is reduced.

In the reaction force offset control according to the lateral position in Example 1, the shorter the distance to the white line, the larger the offset amount. Therefore, the steering torque neutral position is offset to a position more distant from the steering angle neutral position with a shorter distance to the white line. When the driver performs corrective steering to return the vehicle driving position to the vicinity of the center of the driving lane, the turning operation amount from the steering angle neutral position needs to be increased as the driving position is closer to the white line. In this event, when the offset amount of the steering torque neutral position relative to the steering angle neutral position is small, there is a possibility that the steering torque exceeds the neutral position and the sign of the steering torque is inverted before the steering wheel comes to the target angle. Therefore, the steering torque can be prevented from exceeding the neutral position by increasing the offset amount with a shorter distance to the white line.

In the reaction force offset control according to the lateral position in Example 1, the lateral position calculation part 36b switches between the lateral positions relative to the left and right white lines at the current position, when the own vehicle reaches the white line. In the reaction force offset control according to the lateral position, the own vehicle more easily returns to the vicinity of the center of the driving lane by increasing the steering reaction force as the own vehicle moves farther from the vicinity of the center of the driving lane. More specifically, the yaw angle integral value (lateral position change) is recognized as the disturbance, and the steering reaction force is controlled so as to guide the vehicle in a direction in which the yaw angle integral value becomes zero. For this reason, when a lane change is made, the yaw angle integral value needs to be reset. If the yaw angle integral value is not reset, the steering reaction force to return the vehicle to the vicinity of the center of the driving lane before the lane change keeps acting even after the lane change. This inhibits the operations by the driver. Note that the vehicle cannot be guided to the vicinity of the center of the driving lane after the lane change only by setting the integral value to zero.

Therefore, in Example 1, when the own vehicle reaches the white line, the operation can be recognized as an intended operation by the driver. In such a case, the lateral positions relative to the left and right white lines at the current position are switched. In other words, by inverting the sign of the yaw angle integral value, the position to which the own vehicle is guided is changed from the vicinity of the center of the driving lane before the lane change to the vicinity of the center of the driving lane after the lane change. Thus, the steering reaction force can be generated to guide the own vehicle to the vicinity of the center of the driving lane after the lane change. In this event, by taking into consideration the ratio $W_2/W_1$ of the lane width $W_2$ of the driving lane after the lane change to the lane width $W_1$ of the driving lane before the lane change, an accurate lateral position can be set, and an optimum offset amount for guiding the own vehicle to the vicinity of the center of the driving lane can be set.

In the reaction force offset control according to the deviation margin time, the reaction force corresponding to the deviation margin time is added as the steering reaction force torque offset amount to the steering reaction force torque. Thus, the steering reaction force characteristics indicating the steering reaction force torque corresponding to the self-aligning torque are offset in a direction in which the shorter the deviation margin time, the larger the absolute value of the steering reaction force torque, as shown in FIG. 18. Note that FIG. 18 shows the case where the vehicle is closer to the right lane and, in the case where the vehicle is closer to the left lane, the steering reaction force characteristics are offset in a direction opposite to that shown in FIG. 18.

As a result, the characteristics indicating the relationship between the steering angle and the steering torque are offset in the direction in which the absolute value of the steering torque is increased, as shown in FIG. 20, and continuously changed from characteristic A to characteristic C as the deviation margin time is reduced. In this event, in order to maintain the steering angle, the steering torque needs to be increased.

If the steering torque is constant, the steering wheel 6 is gradually returned to the steering angle neutral position (point $P_1$ to point $P_2$). Thus, the vehicle driving position can be prevented from being shifted to the right by a sudden turning operation by the driver. On the other hand, when the steering angle is maintained by the driver, the steering angle and the steering torque are moved from point $P_1$ to point $P_3$. When the driver performs corrective steering from this state, the sign of the steering torque is not inverted until the vehicle driving position reaches the steering torque neutral position during a turning operation from the steering angle neutral position, since the steering torque neutral position is offset to the turning side than the steering angle neutral position in characteristic C. Therefore, the driver can control the turning angle of the front wheels 5L and 5R just by reducing the steering torque and stopping the rotation of the steering wheel 6 when the steering wheel 6 comes to the target angle. More specifically, in the reaction force offset control according to the deviation margin time in Example 1, the direction of controlling the force by the driver is not likely to be switched. Thus, the corrective steering by the driver can be facilitated. As a result, the vehicle driving position becomes less likely to be overshot, and thus the corrective steering amount can be reduced.

In the reaction force offset control according to the deviation margin time in Example 1, the shorter the deviation margin time, the larger the offset amount. Thus, the steering torque neutral position is offset to a position farther away from the steering angle neutral position with a shorter deviation margin time. When the driver performs corrective steering to return the vehicle driving position to the vicinity of the center of the driving lane, the shorter the deviation margin time, the higher the possibility of the vehicle driving position being close to the white line. The closer to the white line, the more the turning operation amount from the steering angle neutral position needs to be increased. In this event, when the offset amount of the steering torque neutral position relative to the steering angle neutral position is small, there is a possibility that the steering torque exceeds the neutral position and the sign of the steering torque is inverted before the steering wheel comes to the target angle. Therefore, the steering torque can be prevented from exceeding the neutral position by increasing the offset amount with a shorter distance to the white line.

[Effects Achieved by Combination of Reaction Force Offset Controls According to Lateral Position and Deviation Margin Time]

In the steering reaction force control unit 20, the steering reaction force torque offset section 36 selects the reaction force having a larger absolute value between the reaction force corresponding to the deviation margin time and the reaction force corresponding to the lateral position, as the steering reaction force torque offset amount. The adder 20c adds the steering reaction force torque offset amount to the steering reaction force torque. Thus, the steering reaction force characteristics are offset in the direction in which the absolute value of the steering reaction force torque is increased, according to the deviation margin time or the lateral position.

In the reaction force offset control according to the deviation margin time, when the own vehicle is parallel to the white line, i.e., when the yaw angle is zero, the reaction force corresponding to the deviation margin time is zero. For this reason, only a small reaction force can be generated when the yaw angle is small even if the own vehicle is at a position close to the white line. On the other hand, in the reaction force offset control according to the lateral position, the reaction force (reaction force corresponding to the lateral position) is generated in proportion to the distance to the white line. Thus, the shorter the distance to the white line, the larger the reaction force can be generated. Accordingly, the own vehicle can be more easily returned to the vicinity of the center of the driving lane.

On the other hand, in the reaction force offset control according to the lateral position, when the own vehicle is near the center of the driving lane, the reaction force corresponding to the lateral position is zero. Therefore, the vehicle reaches the white line in a short time when the yaw angle is large and the vehicle speed is high even if the vehicle is near the center of the driving lane. However, it is difficult to increase the steering reaction force with good responsiveness. On the other hand, the reaction force offset control according to the deviation margin time has characteristics that the reaction force (reaction force corresponding to the deviation margin time) is generated according to the deviation margin time, and the reaction force rapidly rises when the deviation margin time becomes 3 seconds or less. Thus, even when the vehicle reaches the white line in a short time, lane departure can be suppressed by increasing the steering reaction force with good responsiveness.

Therefore, by performing both the reaction force offset control according to the deviation margin time and the reaction force offset control according to the lateral position, the lane departure can be effectively suppressed while applying a stable reaction force according to the distance to the white line. In this event, an optimum steering reaction force that is always required can be applied by using the reaction force having a larger absolute value between the reaction force corresponding to the deviation margin time and the reaction force corresponding to the lateral position.

In Example 1, when the white line on one side is lost, the start of the lateral position F/B control, the reaction force offset control according to the lateral position and the reaction force offset control according to the deviation margin time is prohibited. This is because, when the white line on one side is not recognized, the respective controls that require the lateral positions of the own vehicle cannot be properly executed since the lateral positions of the own vehicle relative to the driving lane cannot be accurately known. Note that, although a method for estimating the lost white line is known, it is difficult to accurately estimate the white line on a fork road and the like. For this reason, inappropriate control associated with erroneous estimation may be performed, causing the driver to feel a sense of discomfort. On the other hand, in Example 1, inappropriate control can be avoided by prohibiting the start of the respective controls that require the lateral positions of the own vehicle when the white line on one side is lost.

Moreover, in Example 1, when the white line on one side is lost, the recognition stability for the recognized white line is determined, and the start of the reaction force offset control according to the curvature and the yaw angle F/B control is permitted when the recognition stability is high. This is because, since the curvature and the yaw angle can be obtained from one of the left and right white lines, the controls can be properly executed if one of the left and right white lines is continuously and stably recognized. Therefore, even in a scene in which the state where the white line on one side is lost is continued, for example, even in a scene where the vehicle is driving on a highway with a white line drawn only on one side, the vehicle stability against the disturbance can be improved by the yaw angle F/B control. Moreover, the steering load on the driver during turning can be reduced and the course correction can be facilitated by the reaction force offset control according to the curvature.

As described above, Example 1 achieves the following effects.

(1) The stability control device includes: the steering wheel 6 configured to receive steering input from the driver; the turning unit 2 mechanically uncoupled from the steering wheel 6 and configured to turn the left and right front wheels 5L and 5R; the SBW command turning angle calculation section 31 configured to calculate the SBW command turning angle corresponding to the steering angle of the steering wheel 6; the lateral force calculation section 33 and the SAT calculation section 35 configured to estimate the self-aligning torque based on the steering angle of the steering wheel 6; the yaw angle calculation part 32a configured to detect the yaw angle generated in the vehicle by the disturbance; the disturbance suppression command turning angle calculation section 32 configured to calculate the disturbance suppression command turning angle to suppress the detected yaw angle; the turning control unit 19 configured to control the turning angle of the left and right front wheels 5L and 5R based on the SBW command turning angle and the disturbance suppression command turning angle; and the steering reaction force control unit 20 configured to control the steering reaction force to be applied to the column shaft 7 based on the steering angle of the steering wheel 6. Therefore, there is no need to apply the steering reaction force component that encourages turning to suppress the disturbance. Moreover, since the steering reaction force is not changed by the turning to suppress the disturbance, the sense of discomfort experienced by the driver can be reduced.

(2) The steering reaction force control unit 20 controls the steering reaction force to be applied to the column shaft 7 based on the SBW command turning angle. Therefore, there is no need to apply the steering reaction force component that encourages turning to suppress the disturbance. Moreover, since the steering reaction force is not changed by the turning to suppress the disturbance, the sense of discomfort experienced by the driver can be reduced.

(3) The stability control device further includes the camera 17 for shooting white lines in front of the own vehicle. The yaw angle calculation part 32a calculates the yaw angle based on the image shot by the camera 17. Thus, the yaw angle can be easily and accurately detected.

(4) The stability control device further includes: the image processing unit 21 configured to determine the recognition stability of the white lines; and the control start permission determination part 32j configured to permit the start of the yaw angle F/B control when it is determined that the recognition stability of at least one of the white lines is high. Thus, the vehicle stability against the disturbance can be improved even in a scene in which the state where the white line on one side is lost is continued.

(5) The dead zone is provided, in which the disturbance suppression command turning angle corresponding to the yaw angle is zero when the yaw angle is not more than the predetermined yaw angle threshold (0.1°). Thus, unnecessary application of the disturbance suppression command turning angle associated with a yaw angle detection error can be avoided.

(6) The steering angle of the left and right front wheels 5L and 5R is controlled based on the SBW command turning angle corresponding to the steering angle of the steering wheel 6 mechanically uncoupled from the left and right front wheels 5L and 5R and the disturbance suppression command turning angle to suppress the yaw angle generated in the vehicle by disturbance, and the steering reaction force to be applied to the column shaft 7 is controlled based on the steering angle of the steering wheel 6. Therefore, there is no need to apply the steering reaction force component that encourages turning to suppress the disturbance. Moreover, since the steering reaction force is not changed by the turning to suppress the disturbance, the sense of discomfort experienced by the driver can be reduced.

(7) The stability control device includes: the yaw angle calculation part 32a configured to detect the yaw angle generated in the vehicle by disturbance; and the SBW controller 4 configured to control the steering angle of the left and right front wheels 5L and 5R based on the SBW command turning angle corresponding to the steering angle of the steering wheel 6 mechanically uncoupled from the left and right front wheels 5L and 5R and the disturbance suppression command turning angle to suppress the yaw angle generated in the vehicle by disturbance, and to control the steering reaction force to be applied to the column shaft 7 based on the steering angle of the steering wheel 6. Therefore, there is no need to apply the steering reaction force component that encourages turning to suppress the disturbance. Moreover, since the steering reaction force is not changed by the turning to suppress the disturbance, the sense of discomfort experienced by the driver can be reduced.

Although the embodiment of the present invention is described above based on the example, the specific configuration of the present invention is not limited to the example, and changes in design and the like are included in the present invention without departing from the scope of the invention.

In the example, the description is given of the example where the yaw angle is detected and the turning unit is controlled based on the turning amount to reduce the yaw angle. Meanwhile, the present invention may be configured to detect a yaw moment generated in a vehicle by disturbance and to control the turning unit based on the turning amount to suppress the yaw moment.

The invention claimed is:

1. A stability control device comprising:
   a steering unit configured to receive steering input from a driver;
   a turning unit mechanically uncoupled from the steering unit and configured to turn a turning wheel;
   a steer-by-wire turning amount calculation unit configured to calculate a steer-by-wire turning amount corresponding to a steering amount of the steering unit;
   a yaw moment detection unit configured to detect a yaw moment generated in a vehicle by disturbance;
   a suppression turning amount calculation unit configured to calculate a suppression turning amount to suppress the yaw moment;
   a turning control unit configured to control a turning amount of the turning unit based on the steer-by-wire turning amount and the suppression turning amount; and
   a steering reaction force control unit configured to control a steering reaction force to be applied to the steering unit based on the steering amount so as not to reflect the suppression turning amount on the steering reaction force.

2. The stability control device according to claim 1, wherein the steering reaction force control unit controls the steering reaction force to be applied to the steering unit, based on the steer-by-wire turning amount.

3. The stability control device according to claim 1, further comprising:
   a camera configured to shoot a white line in front of a vehicle equipped with the stability control device, wherein the yaw moment detection unit detects the yaw moment based on an angle formed by the white line shot by the camera and a traveling direction of the vehicle.

4. The stability control device according to claim 3, further comprising:
   a recognition stability determination unit configured to determine recognition stability of the white line; and
   a control start permission determination unit configured to permit the stability control unit to start the turning amount control when it is determined that the recognition stability of at least one white line is high.

5. The stability control device according to claim 1, wherein a dead zone is provided, in which the suppression turning amount is set to zero when the detected yaw moment is not more than a predetermined threshold.

6. A stability control device, wherein
   the stability control device controls a turning amount of a turning unit based on a steer-by-wire turning amount corresponding to a steering amount of a steering unit mechanically uncoupled from the turning unit and a suppression turning amount to suppress a yaw moment generated in a vehicle by disturbance, and controls a steering reaction force to be applied to the steering unit based on the steering amount so as not to reflect the suppression turning amount on the steering reaction force.

7. A stability control device comprising:
   a sensor configured to detect a yaw moment generated in a vehicle by disturbance; and
   a controller configured to control a turning amount of a turning unit based on a steer-by-wire turning amount corresponding to a steering amount of a steering unit mechanically uncoupled from the turning unit and a suppression turning amount to suppress the yaw moment generated in the vehicle by the disturbance, and to control a steering reaction force to be applied to the steering unit based on the steering amount so as not to reflect the suppression turning amount on the steering reaction force.

* * * * *